United States Patent
Guyomard et al.

(10) Patent No.: US 11,429,246 B2
(45) Date of Patent: *Aug. 30, 2022

(54) DEVICE, METHOD, AND GRAPHICAL USER INTERFACE FOR MANIPULATING 3D OBJECTS ON A 2D SCREEN

(71) Applicant: Apple Inc., Cupertino, CA (US)

(72) Inventors: Gerald Louis Guyomard, Los Altos, CA (US); Etienne H. Guerard, Cupertino, CA (US); Adam Michael O'Hern, Campbell, CA (US); Michelle Chua, Cupertino, CA (US); Robin-Yann Joram Storm, Amsterdam (NL); Adam James Bolton, Bend, OR (US); Zachary Becker, Santa Clara, CA (US); Bradley Warren Peebler, Emerald Hills, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/492,304

(22) Filed: Oct. 1, 2021

(65) Prior Publication Data

US 2022/0019335 A1 Jan. 20, 2022

Related U.S. Application Data

(63) Continuation of application No. 16/887,426, filed on May 29, 2020, now Pat. No. 11,182,044.

(Continued)

(51) Int. Cl.
*G06F 3/0481* (2022.01)
*G06F 3/0484* (2022.01)
(Continued)

(52) U.S. Cl.
CPC ........ *G06F 3/04815* (2013.01); *G06F 3/0481* (2013.01); *G06F 3/0484* (2013.01);
(Continued)

(58) Field of Classification Search
CPC .. G06F 3/04815; G06F 3/0481; G06F 3/0484; G06F 3/04842; G06F 3/04845;
(Continued)

(56) References Cited

U.S. PATENT DOCUMENTS 9,153,062 B2 10/2015 Dorsey et al.
10,203,762 B2 2/2019 Bradski et al.
(Continued)

FOREIGN PATENT DOCUMENTS

WO 2012040827 A2 4/2012

OTHER PUBLICATIONS

IPPI First Examination Report dated Mar. 30, 2022, Indian Patent Application No. 202117043015, pp. 1-6.

*Primary Examiner* — Vijay Shankar
(74) *Attorney, Agent, or Firm* — Fernando & Partners, LLP

(57) ABSTRACT

Various implementations disclosed herein include a method performed by a device. The method includes displaying a three-dimensional object in a three-dimensional space. The method includes displaying a spatial manipulation user interface element including a set of spatial manipulation affordances respectively associated with a set of spatial manipulations of the three-dimensional object. Each of the set of spatial manipulations corresponds to a translational movement of the three-dimensional object along a corresponding axis of the three-dimensional space. The method includes detecting a first user input directed to a first spatial manipulation affordance of the spatial manipulation affordance. The first spatial manipulation affordance is associated (Continued)

with a first axis of the three-dimensional space. The method includes, in response to detecting the first user input directed to the first spatial manipulation affordance, translationally moving the three-dimensional object along the first axis of the three-dimensional space.

25 Claims, 37 Drawing Sheets

Related U.S. Application Data

(60) Provisional application No. 62/906,936, filed on Sep. 27, 2019, provisional application No. 62/856,056, filed on Jun. 1, 2019.

(51) Int. Cl.
 *G06F 3/0488* (2022.01)
 *G06F 3/04815* (2022.01)
 *G06F 3/04842* (2022.01)
 *G06F 3/04845* (2022.01)

(52) U.S. Cl.
 CPC ........ *G06F 3/0488* (2013.01); *G06F 3/04842* (2013.01); *G06F 3/04845* (2013.01)

(58) Field of Classification Search
 CPC .... G06F 3/0488; G06F 3/011; G06F 3/04847; G06F 3/04883
 See application file for complete search history.

(56) References Cited

U.S. PATENT DOCUMENTS

| | | | |
|---|---|---|---|
| 10,852,838 | B2 | 12/2020 | Bradski et al. |
| 11,182,044 | B2* | 11/2021 | Guyomard ............ G06F 3/0481 |
| 2005/0083314 | A1 | 4/2005 | Shalit et al. |
| 2012/0290958 | A1 | 11/2012 | Letzelter et al. |
| 2018/0113596 | A1 | 4/2018 | Ptak et al. |
| 2019/0197778 | A1 | 6/2019 | Sachdeva et al. |
| 2019/0206134 | A1 | 7/2019 | Devam et al. |
| 2020/0368616 | A1 | 11/2020 | Delamont |

* cited by examiner

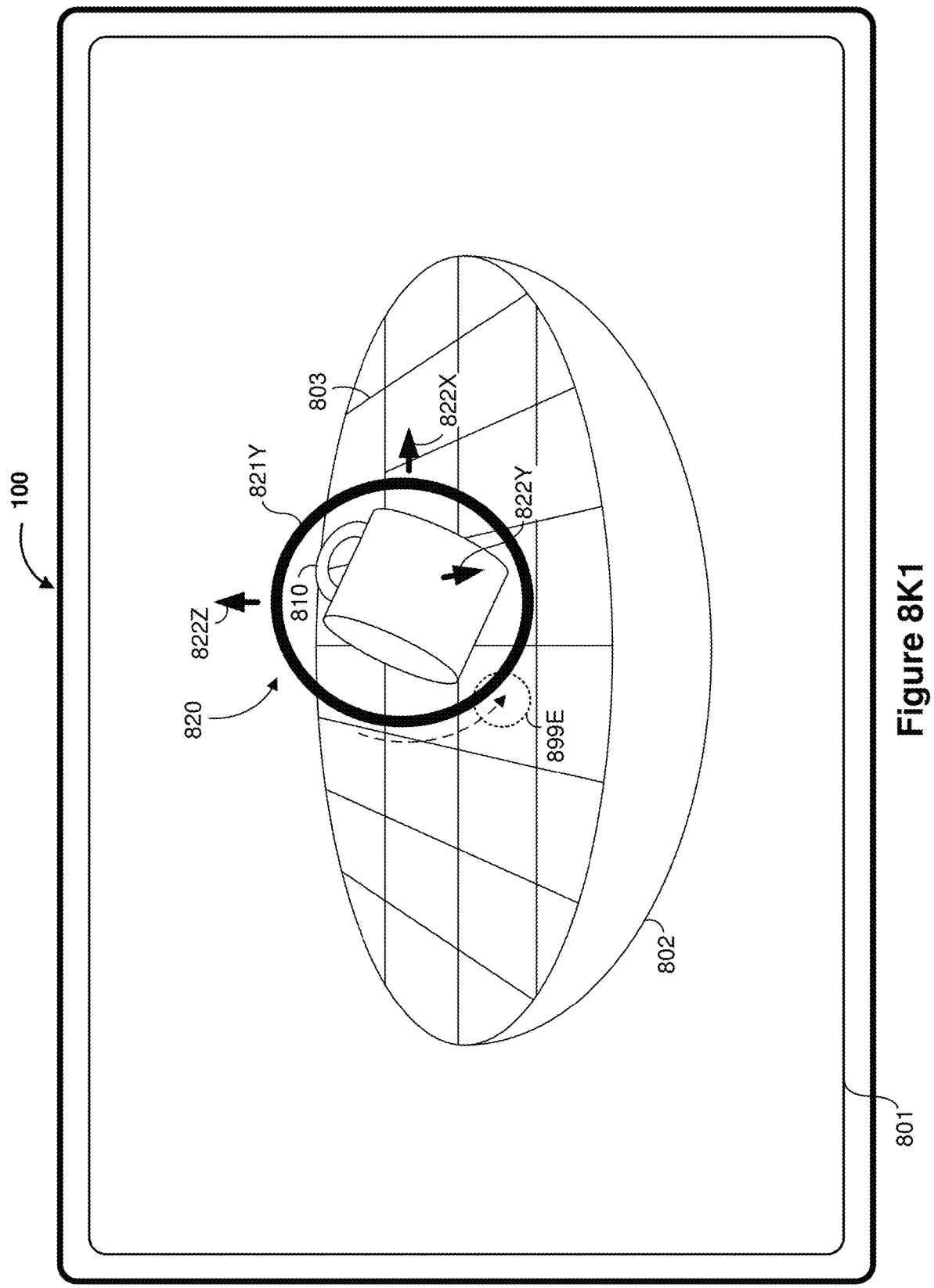
Figure 8K1

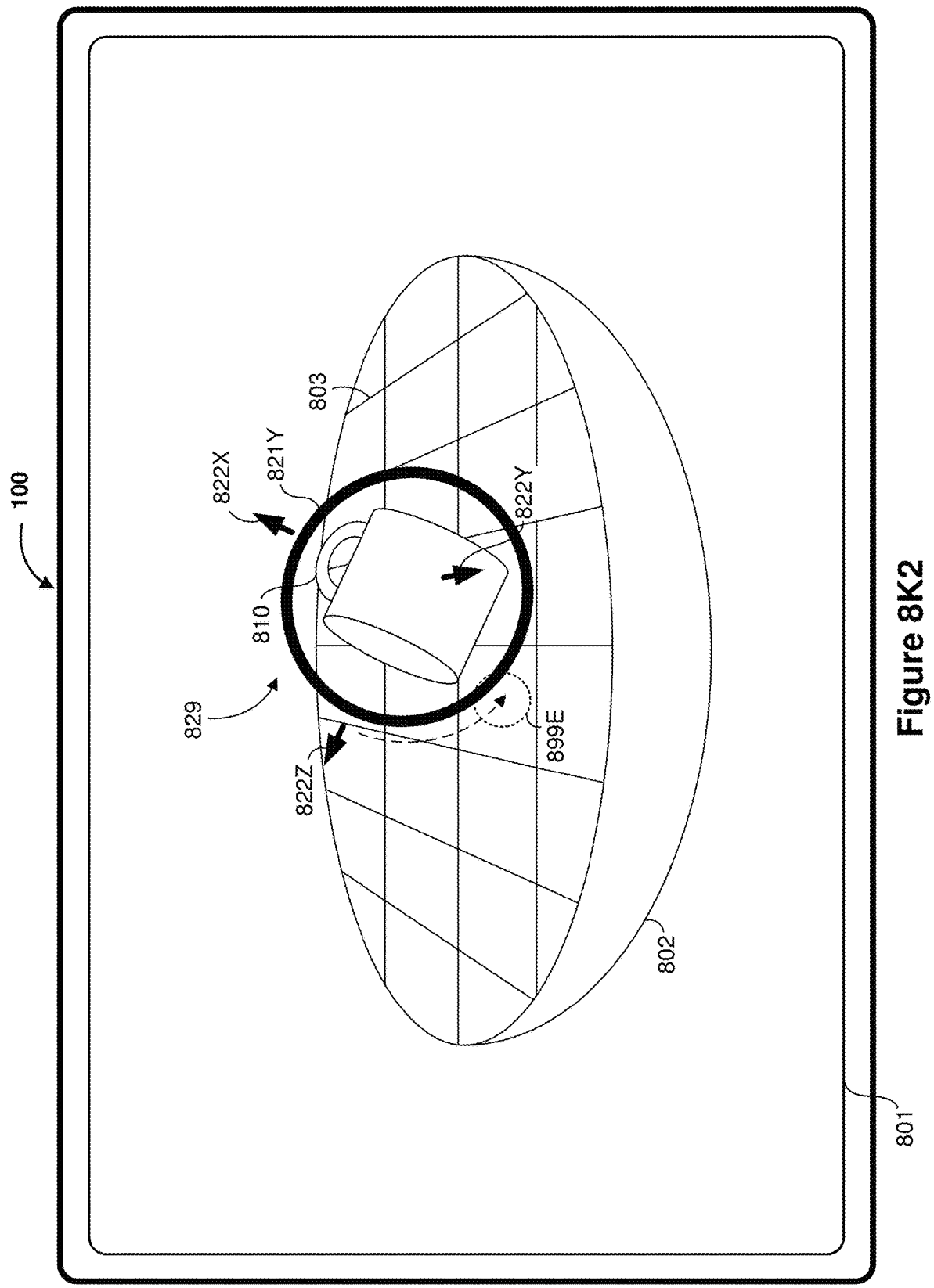
Figure 8K2

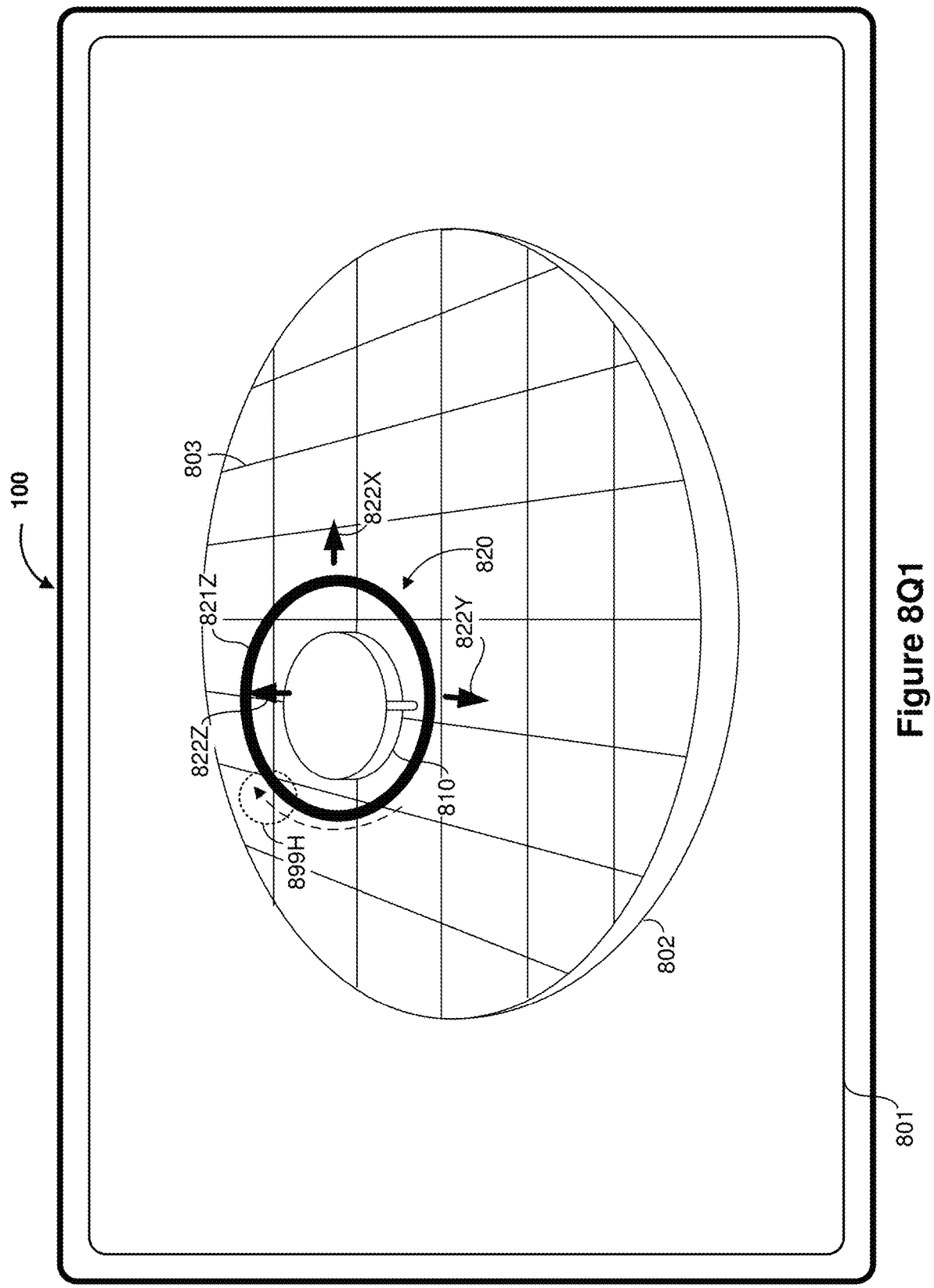
Figure 8Q1

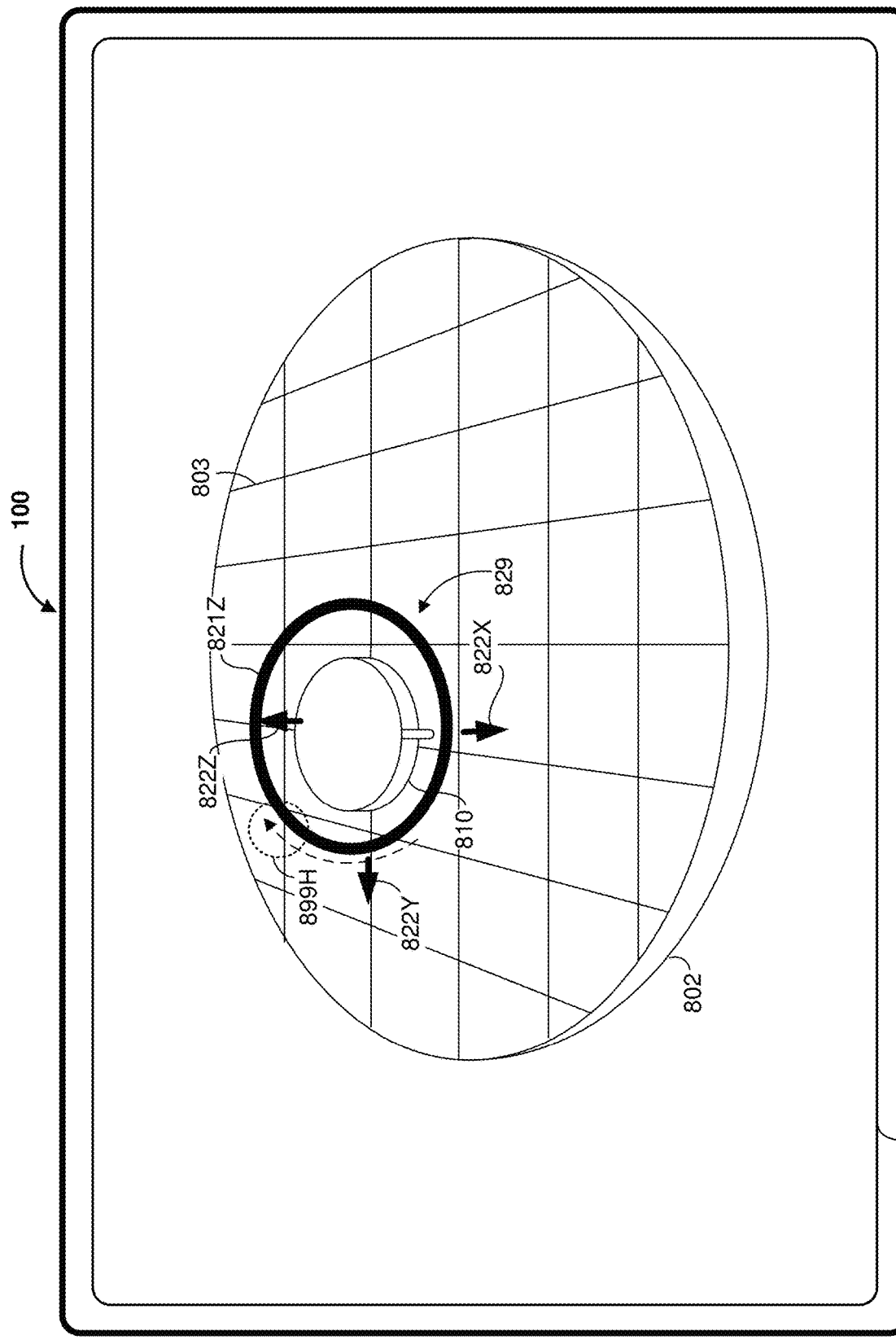
Figure 8Q2

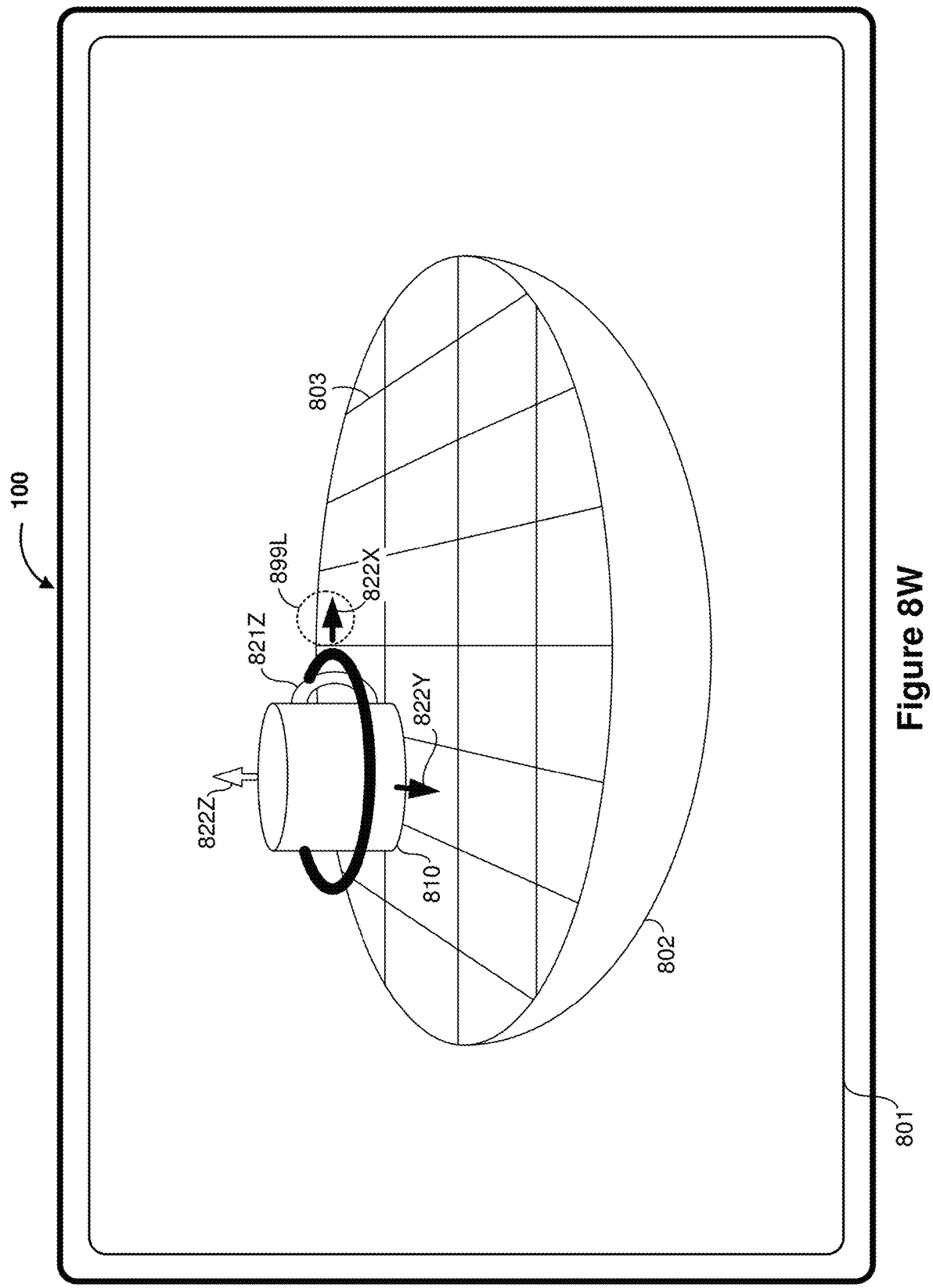

900

910 — Displaying a three-dimensional object in a three-dimensional space from a first virtual camera perspective, wherein the three-dimensional space is defined by a three-dimensional coordinate system including three perpendicular axes

920 — Displaying a spatial manipulation user interface element including a first set of spatial manipulation affordances respectively associated with a first set of spatial manipulations of the three-dimensional object, wherein the first set of spatial manipulations is based on the first virtual camera perspective

930 — Detecting a user input changing the first virtual camera perspective to a second virtual camera perspective

940 — In response to detecting the user input, displaying the three-dimensional object in the three-dimensional space from the second virtual camera perspective

950 — In response to detecting the user input, displaying the spatial manipulation user interface element including a second set of spatial manipulation affordances respectively associated with a second set of spatial manipulations of the three-dimensional object, wherein the second set of spatial manipulations is based on the second virtual camera perspective, wherein the first set of spatial manipulations includes at least one spatial manipulation excluded from the second set of spatial manipulations and the second set of spatial manipulations includes at least one spatial manipulation excluded from the first set of spatial manipulations

Figure 9

DEVICE, METHOD, AND GRAPHICAL USER INTERFACE FOR MANIPULATING 3D OBJECTS ON A 2D SCREEN

CROSS-REFERENCE TO RELATED APPLICATIONS

This application is a continuation of U.S. Nonprovisional patent application Ser. No. 16/887,426, filed on May 29, 2020, which claims priority to U.S. Provisional Patent Application No. 62/856,056, filed on Jun. 1, 2019, and to U.S. Provisional Patent Application No. 62/906,936, filed on Sep. 27, 2019, all of which are hereby incorporated by reference in their entirety.

TECHNICAL FIELD

This relates generally to electronic devices with touch-sensitive surfaces, including but not limited to electronic devices with touch-sensitive surfaces that spatially manipulate three-dimensional objects on a two-dimensional screen.

BACKGROUND

Programming a computer-generated reality (CGR) application can be a difficult and time-consuming process, requiring expert knowledge in, for example, 3D object design and application coding. This presents a high barrier to the generation of quality CGR applications.

In particular, placing one or more CGR objects at desired locations and/or orientations in a CGR scene can be a cumbersome and/or confusing process.

SUMMARY

Accordingly, there is a need for electronic devices with faster, more efficient methods and interfaces for spatially manipulating three-dimensional objects (such as CGR objects) using a two-dimensional screen. Such methods and interfaces optionally complement or replace conventional methods for spatially manipulating three-dimensional objects using a two-dimensional screen. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some implementations, the device is a desktop computer. In some implementations, the device is portable (e.g., a notebook computer, tablet computer, or handheld device). In some implementations, the device has a touchpad. In some implementations, the device has a touch-sensitive display (also known as a "touch screen" or "touch-screen display"). In some implementations, the device has a graphical user interface (GUI), one or more processors, memory and one or more modules, programs or sets of instructions stored in the memory for performing multiple functions. In some implementations, the user interacts with the GUI primarily through stylus and/or finger contacts and gestures on the touch-sensitive surface. In some implementations, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some implementations, a method is performed at a device with one or more processors, non-transitory memory, and a display. The method includes displaying a three-dimensional object in a three-dimensional space from a first virtual camera perspective. The method includes displaying a spatial manipulation user interface element including a first set of spatial manipulation affordances respectively associated with a first set of spatial manipulations. The method includes detecting a user input changing the first virtual camera perspective to a second virtual camera perspective. In response to detecting the user input changing the first virtual camera perspective to the second virtual camera perspective, the method includes displaying the three-dimensional object in the three-dimensional space from the second virtual camera perspective and displaying the spatial manipulation user interface element including a second set of spatial manipulation affordances respectively associated with a second set of spatial manipulations, wherein the first set of spatial manipulations includes at least one spatial manipulation excluded from the second set of spatial manipulations and the second set of spatial manipulations includes at least one spatial manipulation excluded from the first set of spatial manipulations.

In accordance with some implementations, an electronic device includes a display, one or more input devices, one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device with a display and one or more input devices, cause the device to perform or cause performance of the operations of any of the methods described herein. In accordance with some implementations, a graphical user interface on an electronic device with a display, one or more input devices, a non-transitory memory, and one or more processors configured to execute one or more programs stored in the non-transitory memory, including one or more of the elements displayed in any of the methods described above, which are updated in response to inputs, as described in any of the methods described herein. In accordance with some implementations, an electronic device includes: a display, one or more input devices; and means for performing or causing performance of the operations of any of the methods described herein. In accordance with some implementations, an information processing apparatus, for use in an electronic device with a display and one or more input devices, includes means for performing or causing performance of the operations of any of the methods described herein.

Thus, electronic devices with displays and input devices, such as touch-sensitive surfaces are provided with faster, more efficient methods and interfaces for spatially manipulating three-dimensional objects, thereby increasing the effectiveness, efficiency, and user satisfaction with such devices. Such methods and interfaces may complement or replace conventional methods for spatially manipulating three-dimensional objects.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIG. 9 is a flowchart representation of a method of spatially manipulating a three-dimensional object in a three-dimensional space in accordance with some implementations.

DESCRIPTION OF IMPLEMENTATIONS

Figure 1A:
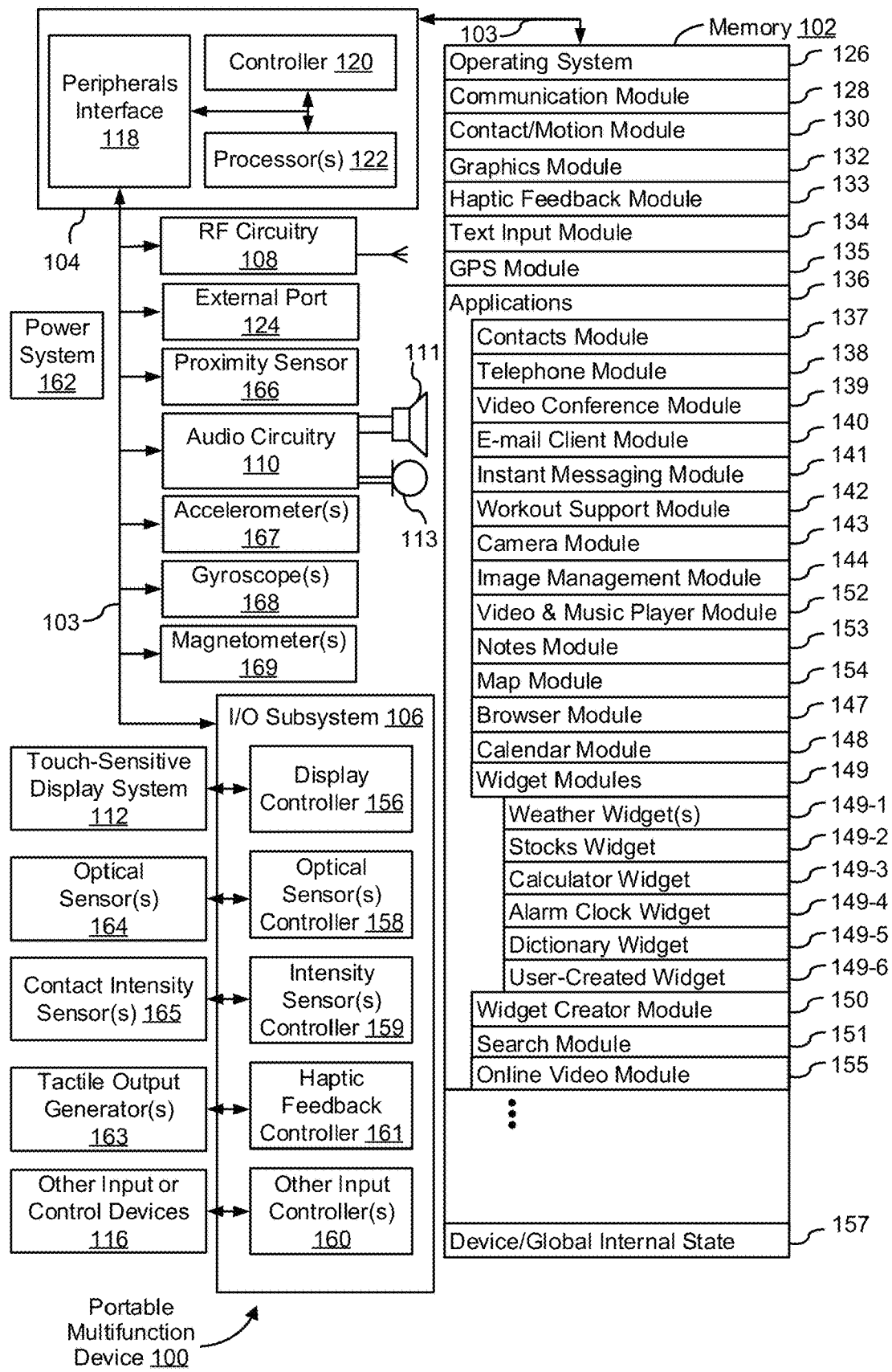
FIG. 1A is a block diagram illustrating a portable multifunction device with a touch-sensitive display in accordance with some implementations.

In accordance with various implementations, a graphical user interface (GUI) is provided to simplify the spatial manipulation of a three-dimensional object in a three-dimensional space, such as a CGR object in a CGR scene.

Below, FIGS. 1A-1B, 2-3, and 4A-4B provide a description of example CGR scene generating devices. FIGS. 5A-5B, 6, and 7 provide a description of example CGR scene presenting devices. FIGS. 8A-8Y illustrate example user interfaces for spatially manipulating a CGR object in a CGR scene. The user interfaces in FIGS. 8A-8Y are used to illustrate the process in FIG. 9.

EXAMPLE CGR DEVICES

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Implementations of electronic devices, user interfaces for such devices, and associated processes for using such devices are described. In some implementations, the device is a portable communications device, such as a mobile telephone, that also contains other functions, such as PDA and/or music player functions. Example implementations of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some implementations, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward implementations of portable devices with touch-sensitive displays. FIG. 1A is a block diagram illustrating portable multifunction device 100 with touch-sensitive display system 112 in accordance with some implementations. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some implementations, peripherals interface 118, CPU(s) 120, and memory controller 122 are, optionally, implemented on a single chip, such as chip 104. In some other implementations, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some implementations, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate implementations, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some implementations, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example implementation, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other implementations. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example implementation, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some implementations, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some implementations, the user interface is designed to work with finger-based contacts and gestures, which can be less precise than stylus-based input due to the larger area of contact of a finger on the touch screen. In some implementations, the device translates the rough finger-based input into a precise pointer/cursor position or command for performing the actions desired by the user.

In some implementations, in addition to the touch screen, device 100 optionally includes a touchpad for activating or deactivating particular functions. In some implementations, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some implementations, an optical sensor is located on the back of device 100, opposite touch-sensitive display system 112 on the front of the device, so that the touch screen is enabled for use as a viewfinder for still and/or video image acquisition. In some implementations, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some implementations, at least one contact intensity sensor is collocated with, or proximate to, a touch-sensitive surface (e.g., touch-sensitive display system 112). In some implementations, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some implementations, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some implementations, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some implementations, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some implementations, information is displayed on the touch-screen display in a portrait view or a landscape view based on an analysis of data received from the one or more accelerometers. Device 100 optionally includes a GPS (or GLONASS or other global navigation system) receiver for obtaining information concerning the location of device 100.

Figure 3:
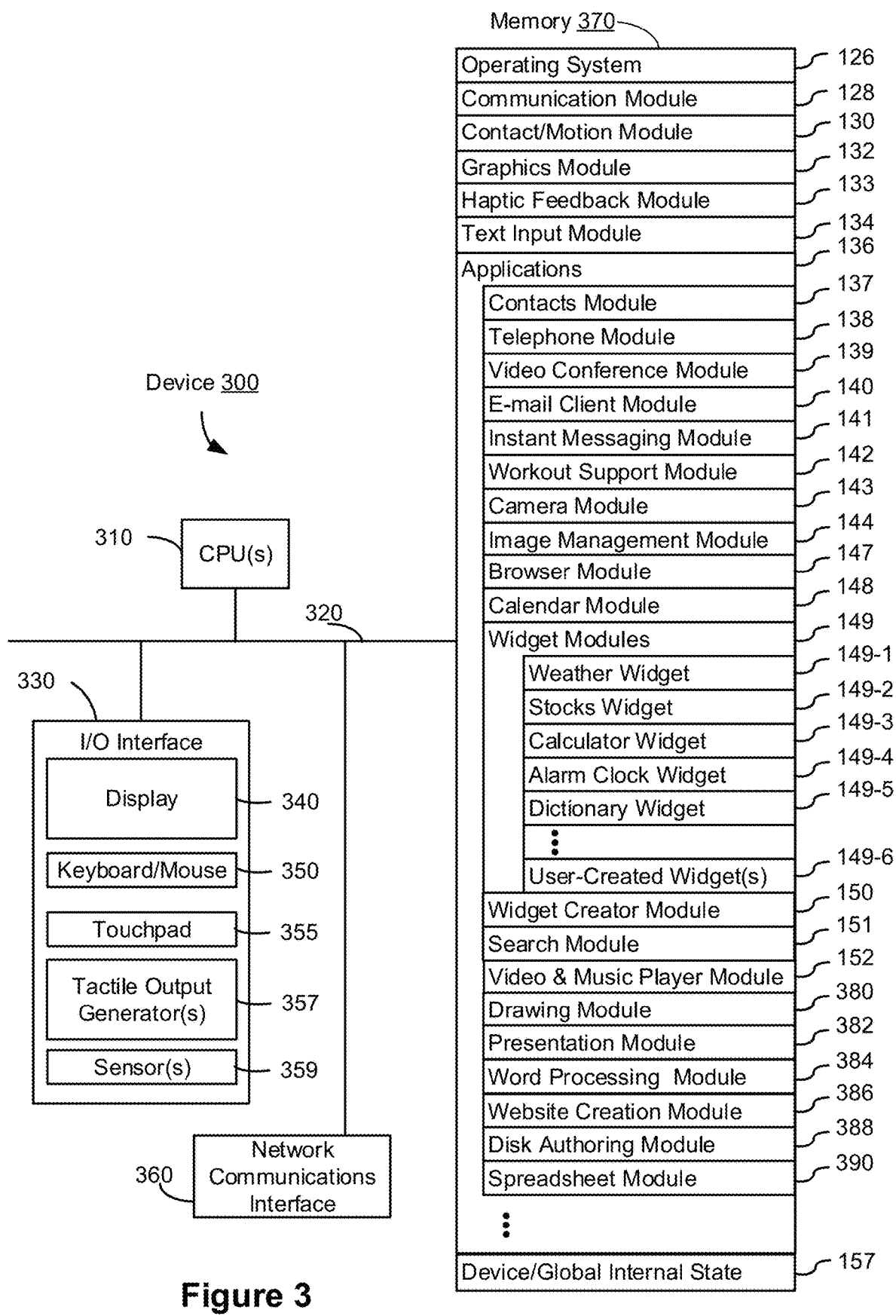
FIG. 3 is a block diagram of an example multifunction device with a display and a touch-sensitive surface in accordance with some implementations.

In some implementations, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some implementations, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some implementations, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some implementations, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some implementations, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some implementations, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some implementations, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some implementations, a widget includes an HTML (Hypertext Markup Language) file, a CSS (Cascading Style Sheets) file, and a JavaScript file. In some implementations, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some implementations, device 100 optionally includes the functionality of an MP3 player, such as an iPod Touch® (trademark of Apple Inc. of Cupertino, Calif.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some implementations, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various implementations. In some implementations, memory 102 optionally stores a subset of the modules and data structures identified above. Furthermore, memory 102 optionally stores additional modules and data structures not described above.

In some implementations, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some implementations, the touchpad, when touched by the user, navigates device 100 to a main, home, or root menu from any user interface that is displayed on device 100. In such implementations, a "menu button" is implemented using a touchpad. In some other implementations, the menu button is a physical push button or other physical input control device instead of a touchpad.

Figure 1B:
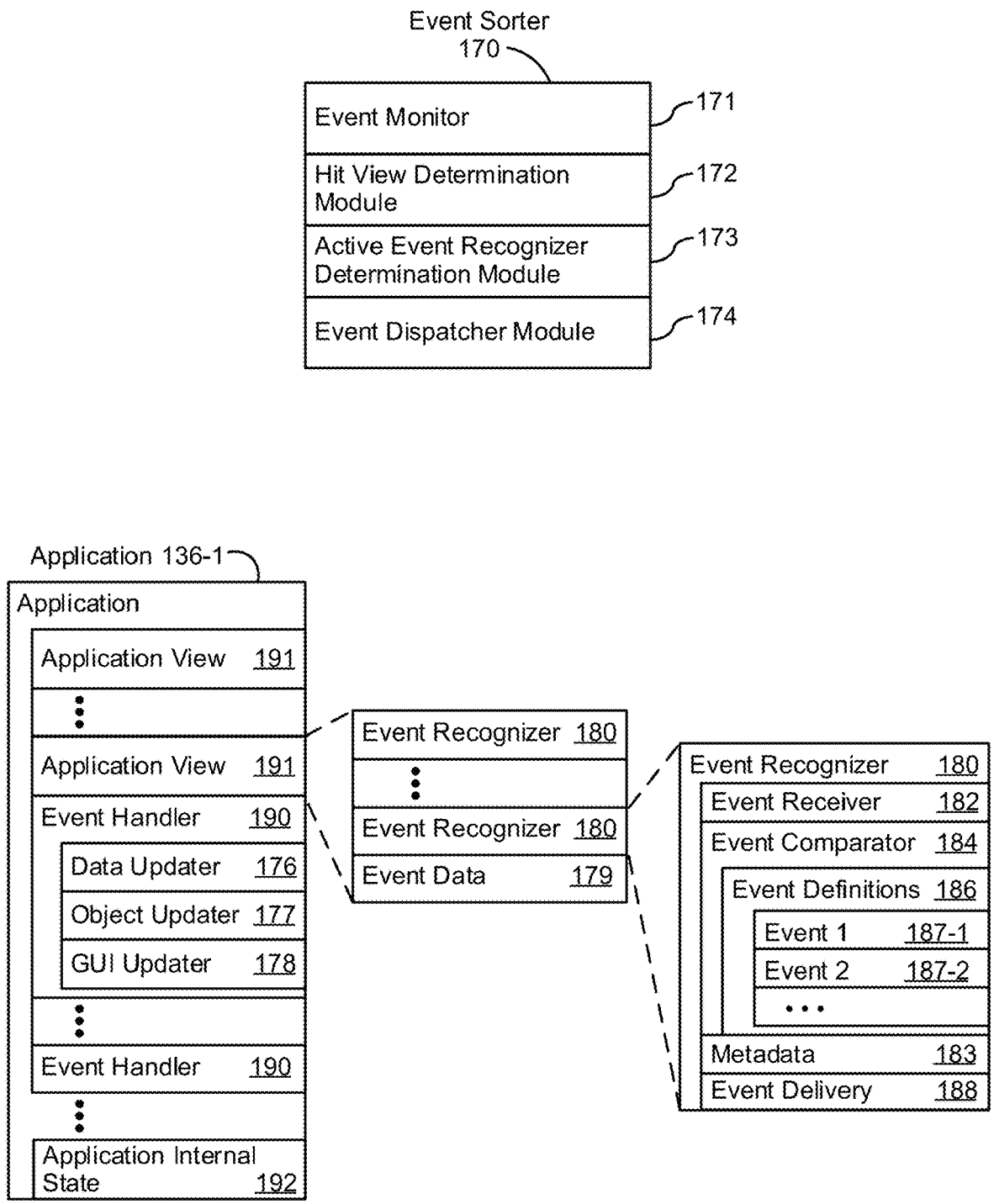
FIG. 1B is a block diagram illustrating example components for event handling in accordance with some implementations.

FIG. 1B is a block diagram illustrating example components for event handling in accordance with some implementations. In some implementations, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some implementations, application 136-1 includes application internal state 192, which indicates the current application view(s) displayed on touch-sensitive display system 112 when the application is active or executing. In some implementations, device/global internal state 157 is used by event sorter 170 to determine which application(s) is (are) currently active, and application internal state 192 is used by event sorter 170 to determine application views 191 to which to deliver event information.

In some implementations, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some implementations, event monitor 171 sends requests to the peripherals interface 118 at predetermined intervals. In response, peripherals interface 118 transmits event information. In other implementations, peripheral interface 118 transmits event information only when there is a significant event (e.g., receiving an input above a predetermined noise threshold and/or for more than a predetermined duration).

In some implementations, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some implementations, active event recognizer determination module 173 determines that only the hit view should receive a particular sequence of sub-events. In other implementations, active event recognizer determination module 173 determines that all views that include the physical location of a sub-event are actively involved views, and therefore determines that all actively involved views should receive a particular sequence of sub-events. In other implementations, even if touch sub-events were entirely confined to the area associated with one particular view, views higher in the hierarchy would still remain as actively involved views.

Event dispatcher module 174 dispatches the event information to an event recognizer (e.g., event recognizer 180). In some implementations including active event recognizer determination module 173, event dispatcher module 174 delivers the event information to an event recognizer determined by active event recognizer determination module 173. In some implementations, event dispatcher module 174 stores in an event queue the event information, which is retrieved by a respective event receiver module 182.

In some implementations, operating system 126 includes event sorter 170. Alternatively, application 136-1 includes event sorter 170. In yet other implementations, event sorter 170 is a stand-alone module, or a part of another module stored in memory 102, such as contact/motion module 130.

In some implementations, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other implementations, one or more of event recognizers 180 are part of a separate module, such as a user interface kit or a higher-level object from which application 136-1 inherits methods and other properties. In some implementations, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some implementations, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some implementations, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some implementations, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some implementations, event comparator 184 includes event definitions 186. Event definitions 186 contain definitions of events (e.g., predefined sequences of sub-events), for example, event 1 (187-1), event 2 (187-2), and others. In some implementations, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some implementations, the event also includes information for one or more associated event handlers 190.

In some implementations, event definition 187 includes a definition of an event for a respective user-interface object. In some implementations, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some implementations, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some implementations, a respective event recognizer 180 includes metadata 183 with configurable properties, flags, and/or lists that indicate how the event delivery system should perform sub-event delivery to actively involved event recognizers. In some implementations, metadata 183 includes configurable properties, flags, and/or lists that indicate how event recognizers interact, or are enabled to interact, with one another. In some implementations, metadata 183 includes configurable properties, flags, and/or lists that indicate whether sub-events are delivered to varying levels in the view or programmatic hierarchy.

In some implementations, a respective event recognizer 180 activates event handler 190 associated with an event when one or more particular sub-events of an event are recognized. In some implementations, a respective event recognizer 180 delivers event information associated with the event to event handler 190. Activating an event handler 190 is distinct from sending (and deferred sending) sub-events to a respective hit view. In some implementations, event recognizer 180 throws a flag associated with the recognized event, and event handler 190 associated with the flag catches the flag and performs a predefined process.

In some implementations, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some implementations, data updater 176 creates and updates data used in application 136-1. For example, data updater 176 updates the telephone number used in contacts module 137, or stores a video file used in video and music player module 152. In some implementations, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some implementations, event handler(s) 190 includes or has access to data updater 176, object updater 177, and GUI updater 178. In some implementations, data updater 176, object updater 177, and GUI updater 178 are included in a single module of a respective application 136-1 or application view 191. In other implementations, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
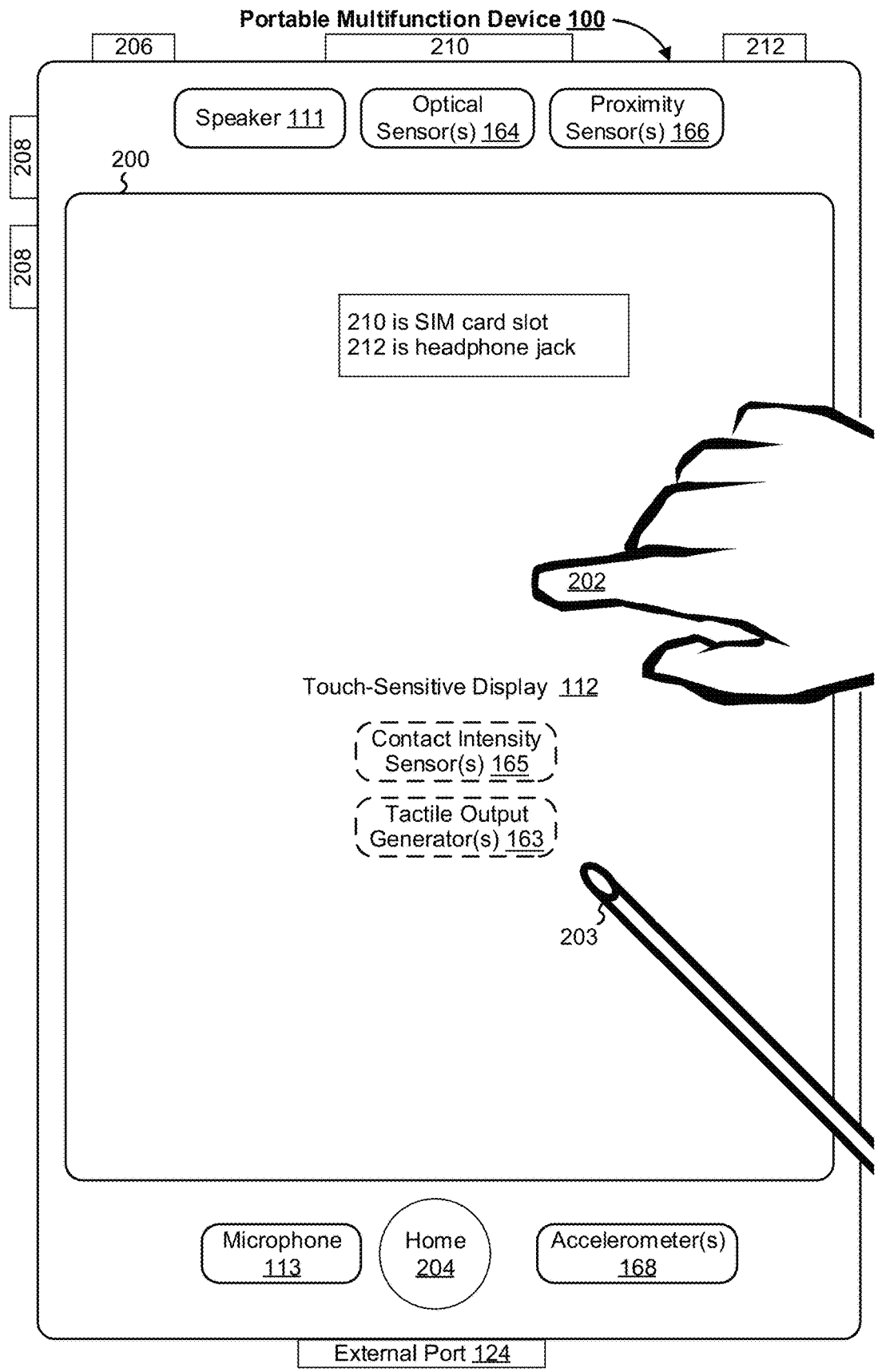
FIG. 2 illustrates a portable multifunction device having a touch screen in accordance with some implementations.

FIG. 2 illustrates a portable multifunction device 100 having a touch screen (e.g., touch-sensitive display system 112, FIG. 1A) in accordance with some implementations. The touch screen optionally displays one or more graphics within user interface (UI) 200. In this implementation, as well as others described below, a user is enabled to select one or more of the graphics by making a gesture on the graphics, for example, with one or more fingers 202 (not drawn to scale in the figure) or one or more styluses 203 (not drawn to scale in the figure). In some implementations, selection of one or more graphics occurs when the user breaks contact with the one or more graphics. In some implementations, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some implementations, the menu button is implemented as a soft key in a GUI displayed on the touch-screen display.

In some implementations, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some implementations, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an example multifunction device with a display and a touch-sensitive surface in accordance with some implementations. Device 300 need not be portable. In some implementations, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some implementations, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various implementations. In some implementations, memory 370 optionally stores a subset of the modules and data structures identified above.

Furthermore, memory 370 optionally stores additional modules and data structures not described above.

Attention is now directed towards implementations of user interfaces ("UI") that are, optionally, implemented on portable multifunction device 100.

Figure 4A:
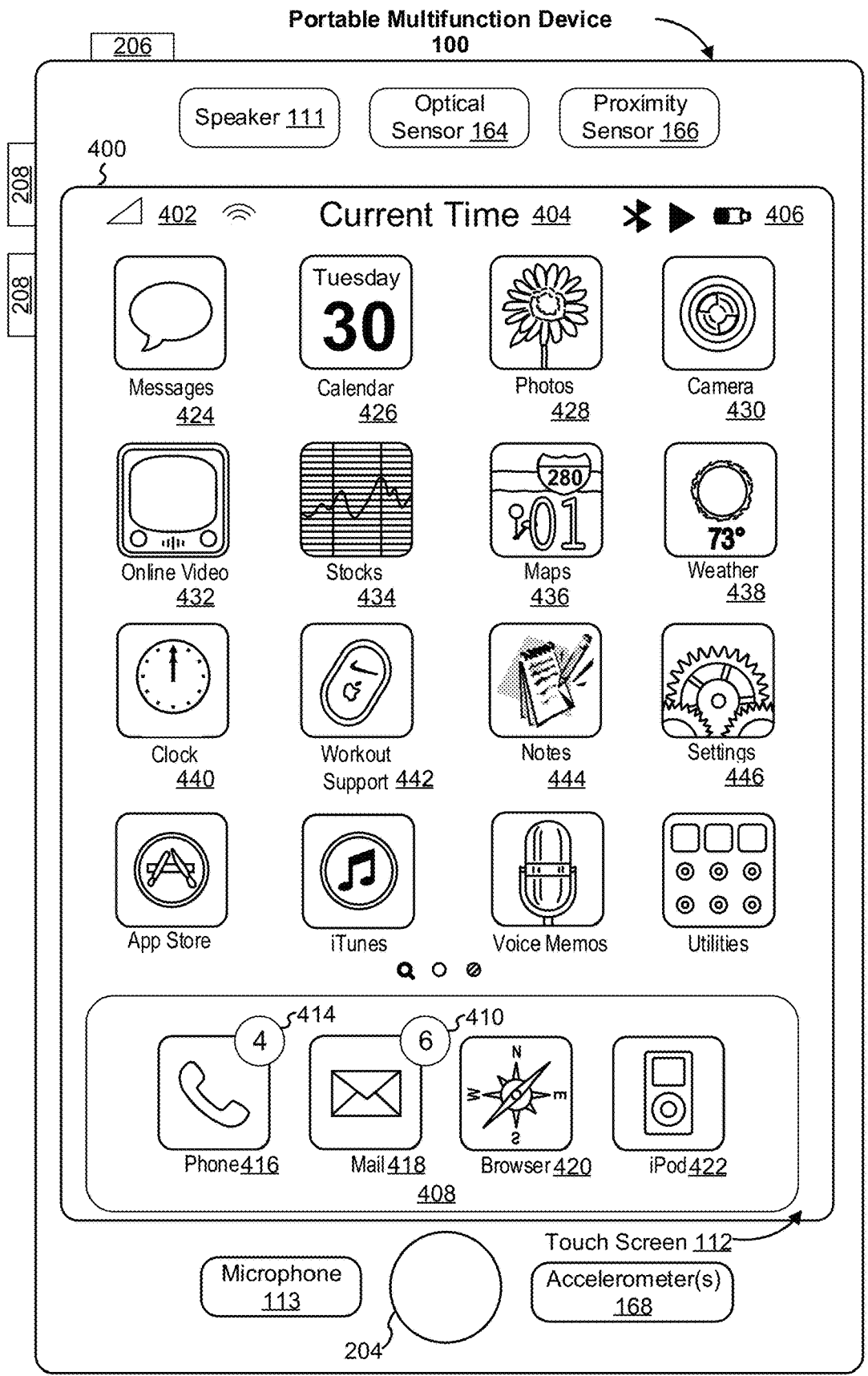
FIG. 4A illustrates an example user interface for a menu of applications on a portable multifunction device in accordance with some implementations.

FIG. 4A illustrates an example user interface for a menu of applications on portable multifunction device 100 in accordance with some implementations. Similar user interfaces are, optionally, implemented on device 300. In some implementations, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser"; and
  - Icon 422 for video and music player module 152, also referred to as iPod Touch® (trademark of Apple Inc. of Cupertino, Calif.) module 152, labeled "iPod"; and
- Icons for other applications, such as:
  - Icon 424 for IM module 141, labeled "Text";
  - Icon 426 for calendar module 148, labeled "Calendar";
  - Icon 428 for image management module 144, labeled "Photos";
  - Icon 430 for camera module 143, labeled "Camera";
  - Icon 432 for online video module 155, labeled "Online Video";
  - Icon 434 for stocks widget 149-2, labeled "Stocks";
  - Icon 436 for map module 154, labeled "Map";
  - Icon 438 for weather widget 149-1, labeled "Weather";
  - Icon 440 for alarm clock widget 169-6, labeled "Clock";
  - Icon 442 for workout support module 142, labeled "Workout Support";
  - Icon 444 for notes module 153, labeled "Notes"; and
  - Icon 446 for a settings application or module, which provides access to settings for device 100 and its various applications 136.

It should be noted that the icon labels illustrated in FIG. 4A are merely examples. For example, in some implementations, icon 422 for video and music player module 152 is labeled "Music" or "Music Player." Other labels are, optionally, used for various application icons. In some implementations, a label for a respective application icon includes a name of an application corresponding to the respective application icon. In some implementations, a label for a particular application icon is distinct from a name of an application corresponding to the particular application icon.

Figure 4B:
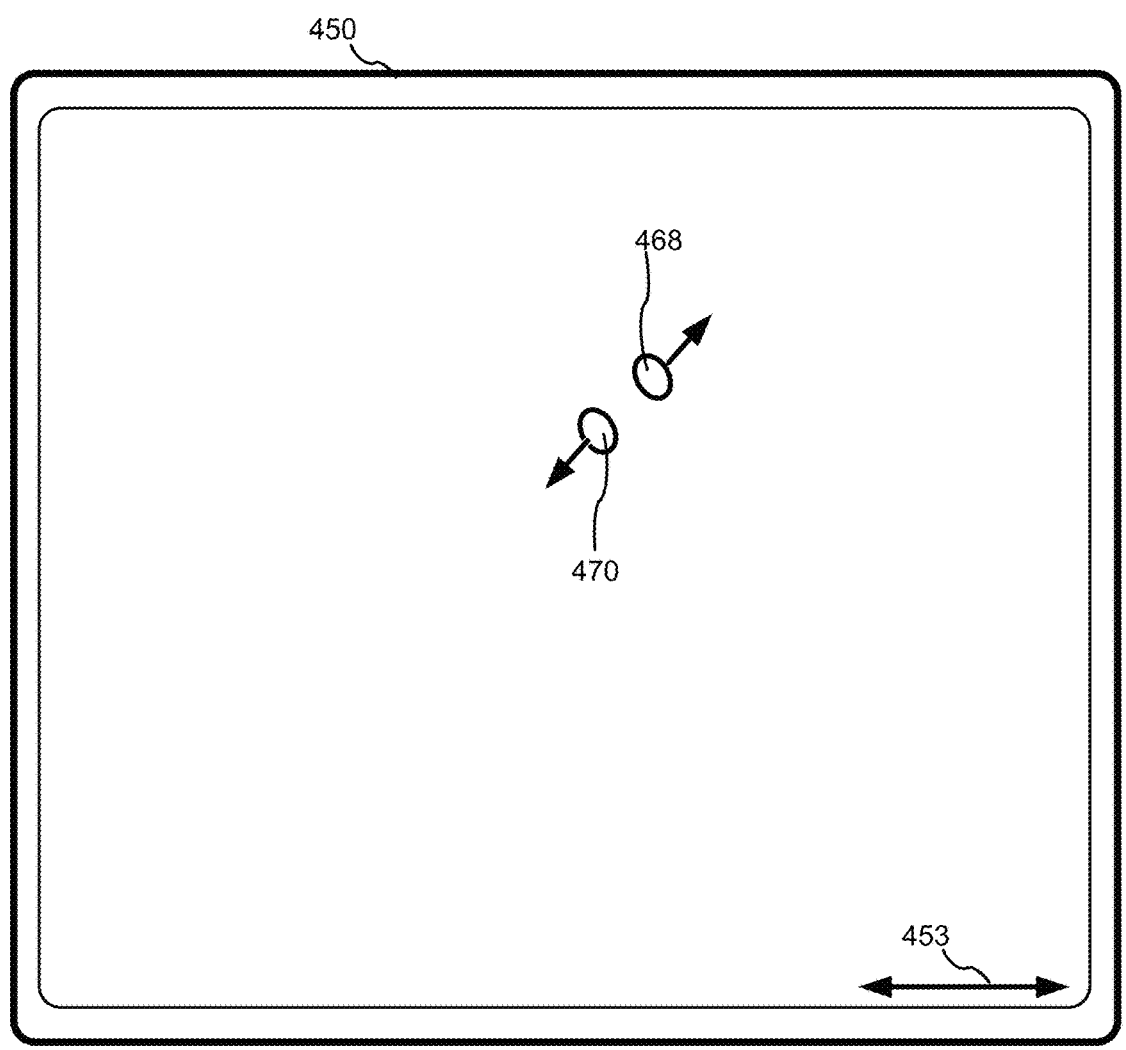
FIG. 4B illustrates an example user interface for a multifunction device with a touch-sensitive surface that is separate from the display in accordance with some implementations.
Figure 4B:
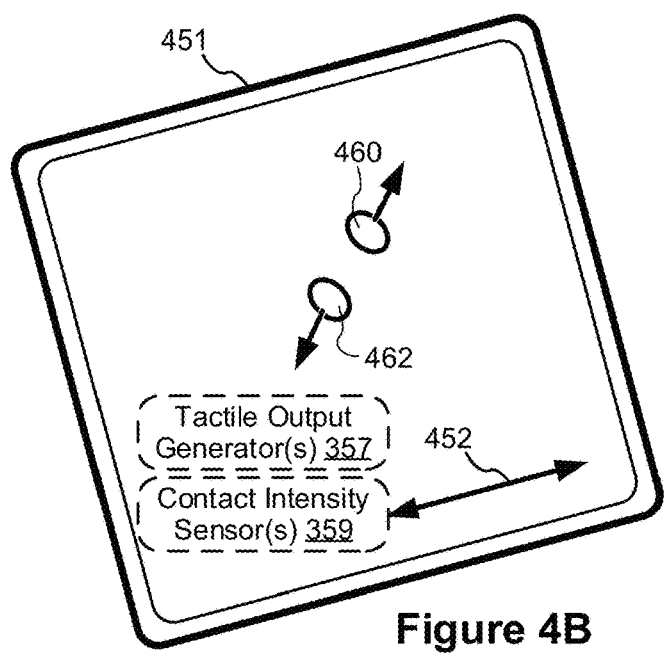

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some implementations, the device detects inputs on a touch-sensitive surface that is separate from the display, as shown in FIG. 4B. In some implementations, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these implementations, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some implementations, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

EXAMPLE CGR FILE PRESENTING DEVICES

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 5:
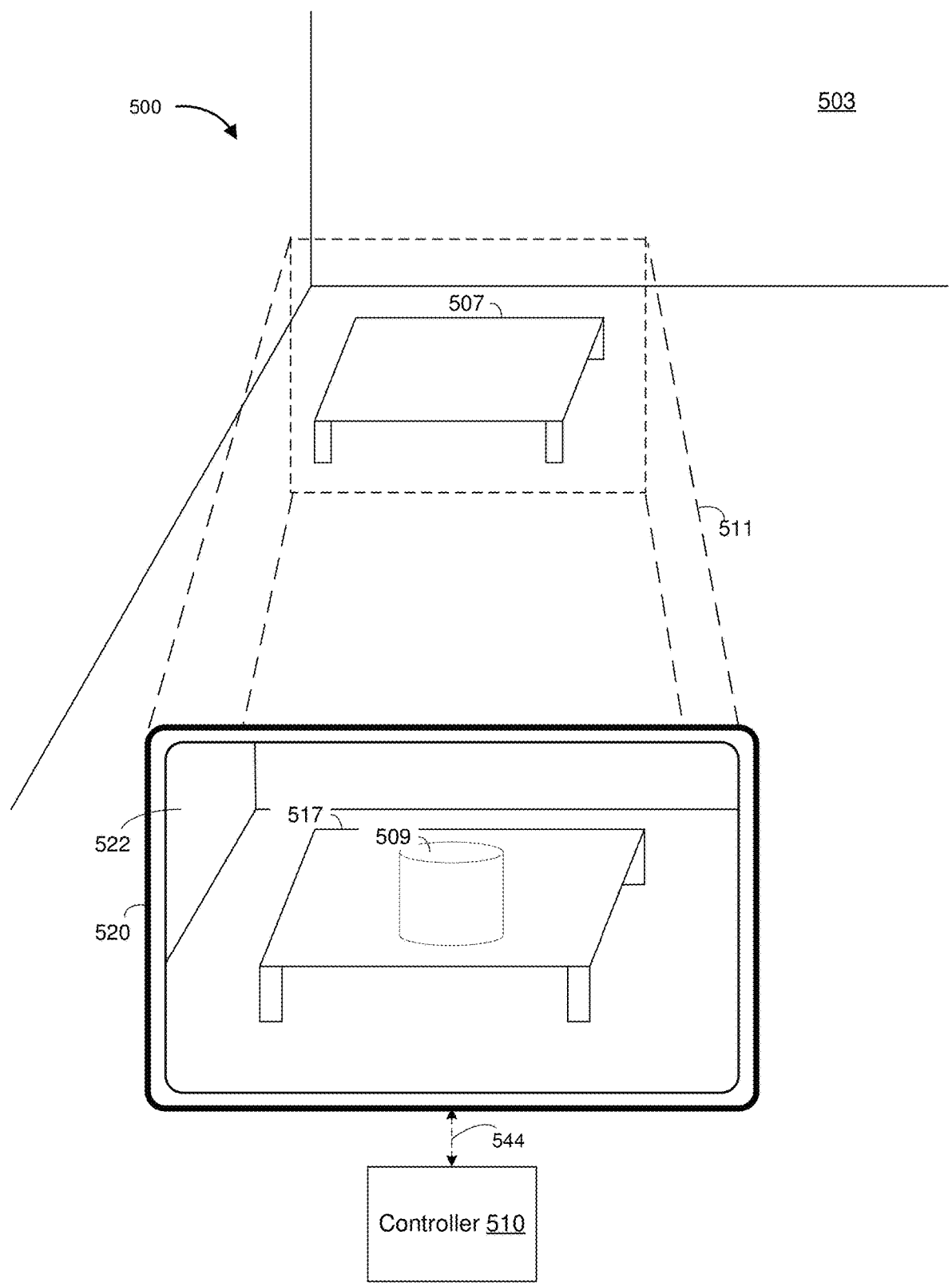
FIG. 5 is a block diagram of an example operating architecture in accordance with some implementations.

FIG. 5 is a block diagram of an example operating architecture 500 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 500 includes a controller 110 and an electronic device 520.

In some implementations, the controller 510 is configured to manage and coordinate an ER experience for the user. In some implementations, the controller 510 includes a suitable combination of software, firmware, and/or hardware. The controller 510 is described in greater detail below with respect to FIG. 2. In some implementations, the controller 510 is a computing device that is local or remote relative to the scene 503. For example, the controller 510 is a local server located within the scene 503. In another example, the controller 510 is a remote server located outside of the scene 503 (e.g., a cloud server, central server, etc.). In some implementations, the controller 510 is communicatively coupled with the electronic device 520 via one or more wired or wireless communication channels 544 (e.g., BLUETOOTH, IEEE 802.11x, IEEE 802.16x, IEEE 802.3x, etc.). In another example, the controller 510 is included within the enclosure of the electronic device 520. In some implementations, the functionalities of the controller 510 are provided by and/or combined with the electronic device 520.

In some implementations, the electronic device 520 is configured to present CGR content to a user. In some implementations, the electronic device 520 includes a suitable combination of software, firmware, and/or hardware. According to some implementations, the electronic device 520 presents, via a display 522, CGR content to the user while the user is physically present within the scene 503 that includes a table 507 within the field-of-view 511 of the electronic device 520. As such, in some implementations, the user holds the electronic device 520 in his/her hand(s). In some implementations, while providing CGR content, the electronic device 520 is configured to display a virtual object (e.g., a virtual cylinder 509) and to enable video pass-through of the scene 503 (e.g., including a representation 517 of the table 507) on a display 522. The electronic device 520 is described in greater detail below with respect to FIG. 3.

In some implementations, the user wears the electronic device 520 on his/her head. For example, in some implementations, the electronic device 520 includes a head-mounted system (HMS), head-mounted device (HMD), or head-mounted enclosure (HME). As such, the electronic device 520 includes one or more CGR displays provided to display the CGR content. For example, in various implementations, the electronic device 520 encloses the field-of-view of the user. In some implementations, the electronic device 520 is a handheld device (such as a smartphone or tablet) configured to present CGR content, and rather than wearing the electronic device 520, the user holds the device with a display directed towards the field-of-view of the user and a camera directed towards the scene 503. In some implementations, the handheld device can be placed within an enclosure that can be worn on the head of the user. In some implementations, the electronic device 520 is replaced with a CGR chamber, enclosure, or room configured to present CGR content in which the user does not wear or hold the electronic device 120.

Figure 6:
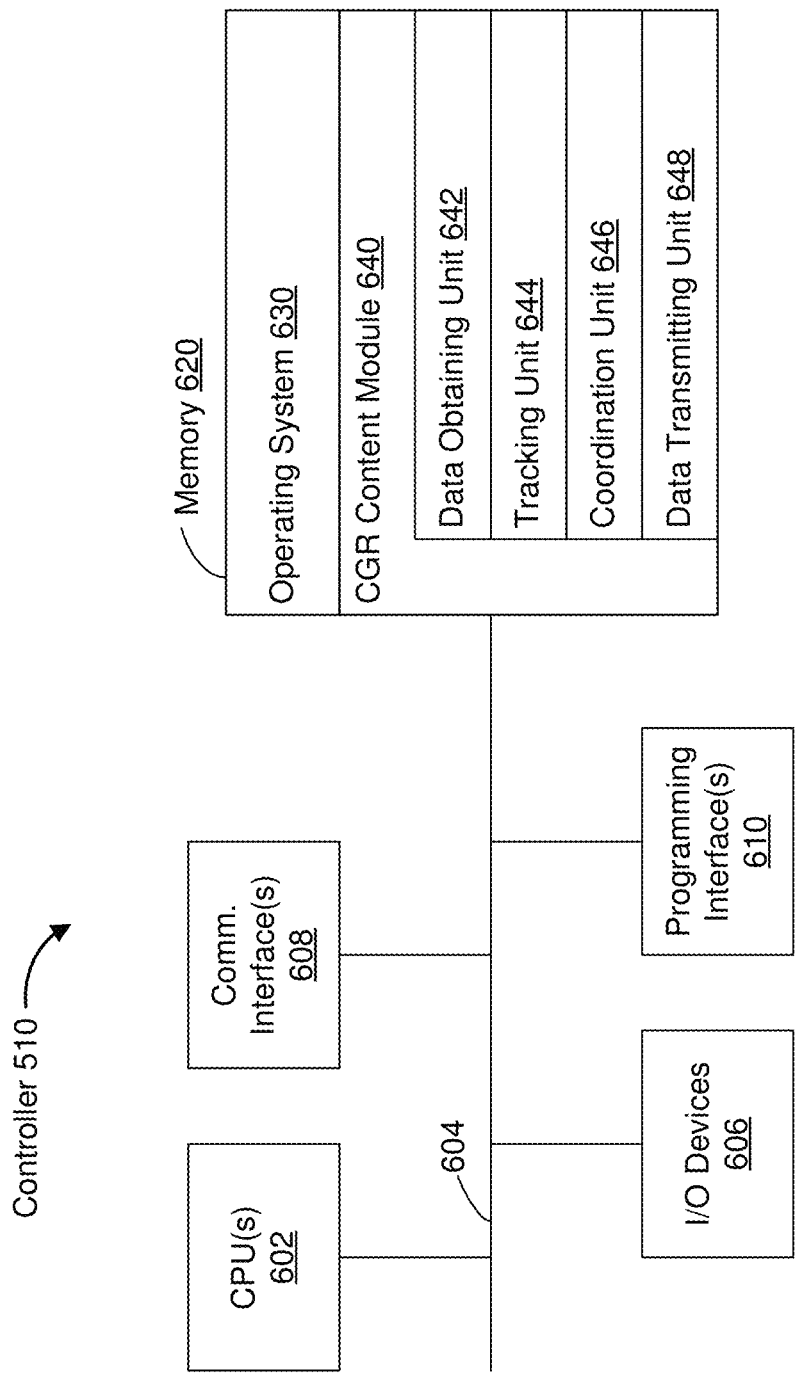
FIG. 6 is a block diagram of an example controller in accordance with some implementations.

FIG. 6 is a block diagram of an example of the controller 510 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 510 includes one or more processing units 602 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 606, one or more communication interfaces 608 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 610, a memory 620, and one or more communication buses 604 for interconnecting these and various other components.

In some implementations, the one or more communication buses 604 include circuitry that interconnects and controls communications between system components. In some implementations, the one or more I/O devices 606 include at least one of a keyboard, a mouse, a touchpad, a joystick, one or more microphones, one or more speakers, one or more image sensors, one or more displays, and/or the like.

The memory 620 includes high-speed random-access memory, such as dynamic random-access memory (DRAM), static random-access memory (SRAM), double-data-rate random-access memory (DDR RAM), or other random-access solid-state memory devices. In some implementations, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 comprises a non-transitory computer readable storage medium. In some implementations, the memory 620 or the non-transitory computer readable storage medium of the memory 620 stores the following programs, modules and data structures, or a subset thereof including an optional operating system 630 and a CGR content module 640.

The operating system 630 includes procedures for handling various basic system services and for performing hardware dependent tasks. In some implementations, the CGR content module 640 is configured to manage and coordinate presentation of CGR content for one or more users (e.g., a single set of CGR content for one or more users, or multiple sets of CGR content for respective groups of one or more users). To that end, in various implementations, the CGR content module 640 includes a data obtaining unit 642, a tracking unit 644, a coordination unit 646, and a data transmitting unit 648.

In some implementations, the data obtaining unit 642 is configured to obtain data (e.g., presentation data, interaction data, sensor data, location data, etc.) from at least the electronic device 520. To that end, in various implementations, the data obtaining unit 642 includes instructions and/or logic therefor, and heuristics and metadata therefor.

In some implementations, the tracking unit 644 is configured to map the scene 503 and to track the position/location of at least the electronic device 520 with respect to the scene 503 of FIG. 5. To that end, in various implementations, the tracking unit 644 includes instructions and/or logic therefor, and heuristics and metadata therefor.

In some implementations, the coordination unit 646 is configured to manage and coordinate the presentation of CGR content to the user by the electronic device 520. To that end, in various implementations, the coordination unit 646 includes instructions and/or logic therefor, and heuristics and metadata therefor.

In some implementations, the data transmitting unit 648 is configured to transmit data (e.g., presentation data, location data, etc.) to at least the electronic device 520. To that end, in various implementations, the data transmitting unit 648 includes instructions and/or logic therefor, and heuristics and metadata therefor.

Although the data obtaining unit 642, the tracking unit 644, the coordination unit 646, and the data transmitting unit 648 are shown as residing on a single device (e.g., the controller 510), it should be understood that in other implementations, any combination of the data obtaining unit 642, the tracking unit 644, the coordination unit 646, and the data transmitting unit 648 may be located in separate computing devices.

Moreover, FIG. 6 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 7:
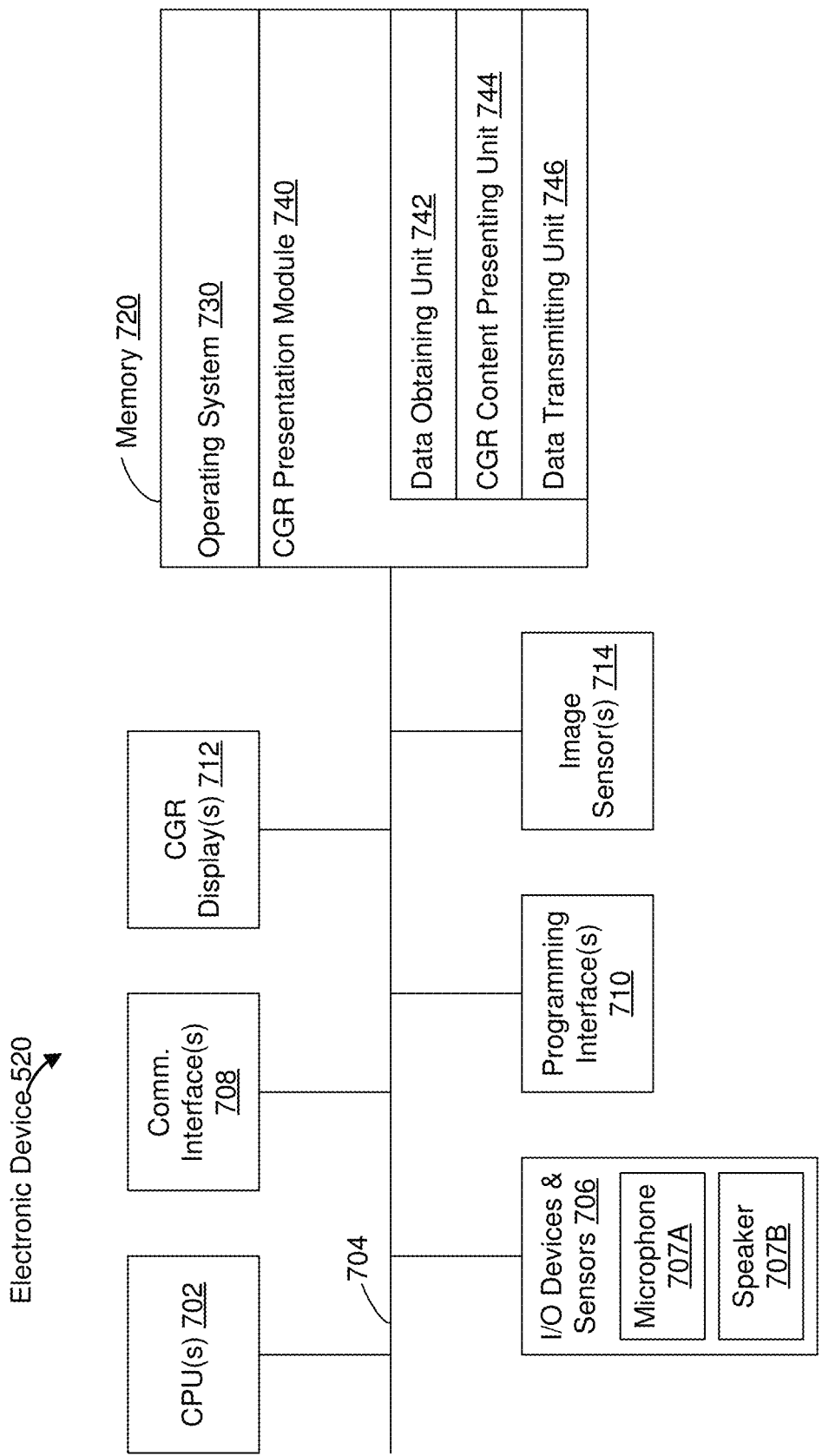
FIG. 7 is a block diagram of an example electronic device in accordance with some implementations.
Figure 8A:
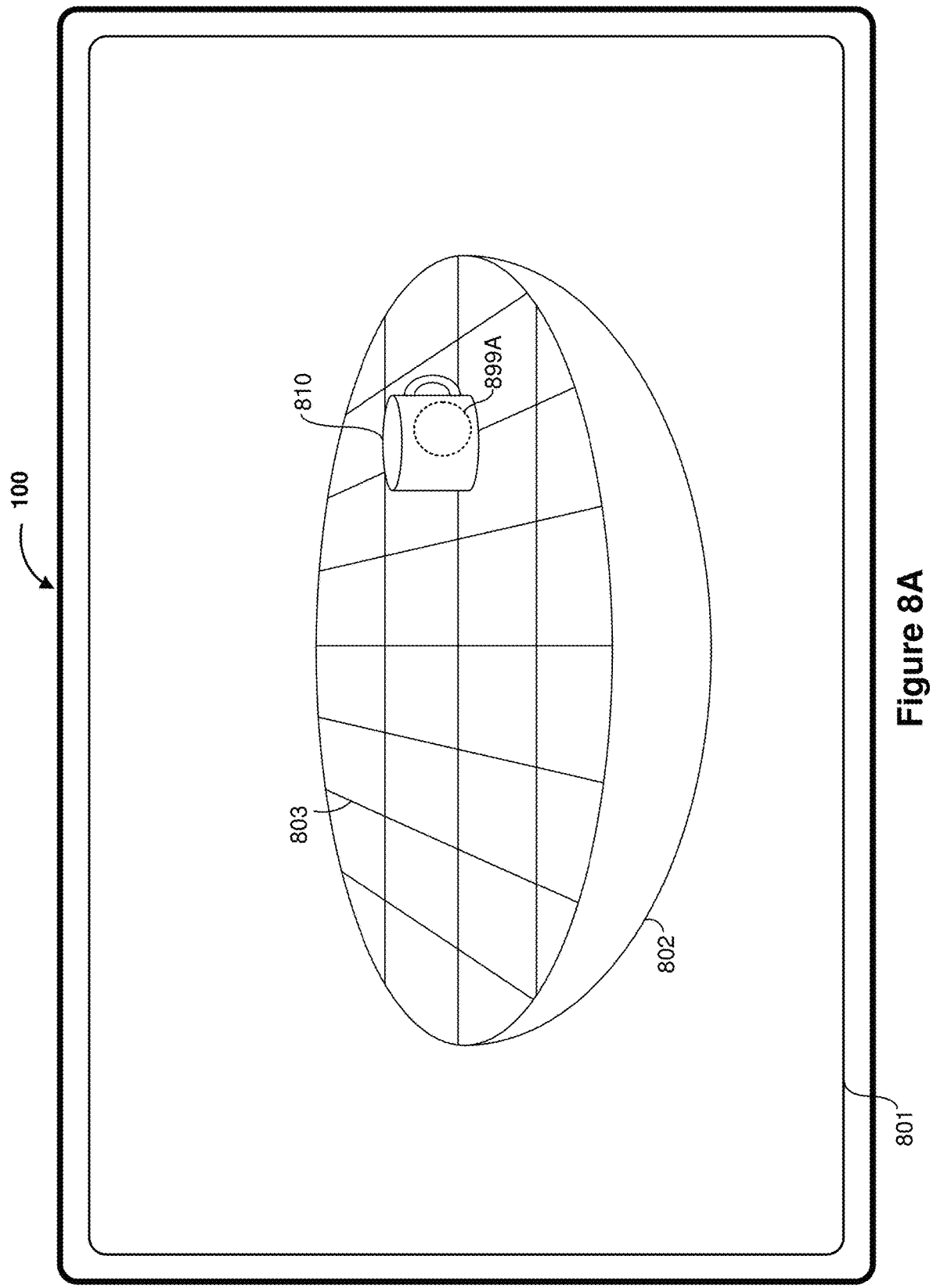
FIGS. 8A-8Y illustrate example user interfaces for generating a CGR file in accordance with some implementations.

FIG. 7 is a block diagram of an example of the electronic device 520 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 520 includes one or more processing units 702 (e.g., microprocessors, ASICs, FPGAs, GPUs, CPUs, processing cores, and/or the like), one or more input/output (I/O) devices and sensors 706, one or more communication interfaces 708 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 710, one or more CGR displays 712, one or more optional interior- and/or exterior-facing image sensors 714, a memory 720, and one or more communication buses 704 for interconnecting these and various other components.

In some implementations, the one or more communication buses 704 include circuitry that interconnects and controls communications between system components. In some implementations, the one or more I/O devices and sensors 706 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones 707A, one or more speakers 707B, a haptics engine, one or more depth sensors (e.g., a structured light, a time-of-flight, or the like), and/or the like.

In some implementations, the one or more CGR displays 712 are configured to display CGR content to the user. In some implementations, the one or more CGR displays 712 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more CGR displays 712 correspond to diffractive, reflective, polarized, holographic, etc. waveguide displays. For example, the electronic device 520 includes a single CGR display. In another example, the electronic device 520 includes a CGR display for each eye of the user.

In some implementations, the one or more image sensors 714 are configured to obtain image data that corresponds to at least a portion of the face of the user that includes the eyes of the user (any may be referred to as an eye-tracking camera). In some implementations, the one or more image sensors 714 are configured to be forward-facing so as to obtain image data that corresponds to the scene as would be viewed by the user if the electronic device 520 was not present (and may be referred to as a scene camera). The one or more optional image sensors 714 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 comprises a non-transitory computer readable storage medium. In some implementations, the memory 720 or the non-transitory computer readable storage medium of the memory 720 stores the following programs, modules and data structures, or a subset thereof including an optional operating system 730 and a CGR presentation module 740.

The operating system 730 includes procedures for handling various basic system services and for performing hardware dependent tasks. In some implementations, the CGR presentation module 740 is configured to present CGR content to the user via the one or more CGR displays 712 and/or the I/O devices and sensors 706 (such as the one or more speakers 707B). To that end, in various implementations, the CGR presentation module 740 includes a data obtaining unit 742, a CGR content presenting unit 744, and a data transmitting unit 746.

In some implementations, the data obtaining unit 742 is configured to obtain data (e.g., presentation data, interaction data, sensor data, location data, etc.) from at least the controller 510 of FIG. 5. In various implementations, the data obtaining unit obtains a CGR file. To that end, in various implementations, the data obtaining unit 742 includes instructions and/or logic therefor, and heuristics and metadata therefor.

In some implementations, the CGR content presenting unit 744 is configured to present CGR content to a user. In various implementations, the CGR content presenting unit 744 presents CGR content of the CGR file according to rules set forth in the CGR file. To that end, in various implementations, the CGR content presenting unit 744 includes instructions and/or logic therefor, and heuristics and metadata therefor.

In some implementations, the data transmitting unit 746 is configured to transmit data (e.g., presentation data, location data, etc.) to at least the controller 510. To that end, in various implementations, the data transmitting unit 746 includes instructions and/or logic therefor, and heuristics and metadata therefor.

Although the data obtaining unit 742, the CGR content presenting unit 744, and the data transmitting unit 746 are shown as residing on a single device (e.g., the electronic device 520 of FIG. 5), it should be understood that in other implementations, any combination of the data obtaining unit 742, the CGR content presenting unit 744, and the data transmitting unit 746 may be located in separate computing devices.

Moreover, FIG. 7 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

In various implementations, CGR content is presented to a user from a CGR file that includes data regarding CGR content and further includes data describing how the CGR content is to be presented. In various implementations, the CGR file includes data regarding one or more CGR scenes. The CGR file further includes data regarding triggers (e.g., detectable events) for presentation of the various CGR scenes. As an example, in various implementations, the CGR file includes data regarding a CGR scene representing a gameboard and also includes data indicating that the CGR scene representing the gameboard is to be presented when a horizontal planar surface is detected in the field-of-view of a scene camera.

The CGR file further includes data regarding one or more CGR objects associated with a respective CGR scene. The CGR file further includes data regarding triggers regarding actions of the CGR objects. As an example, in various implementations, the CGR file includes data regarding a plurality of CGR objects associated with the CGR scene representing the gameboard, each of the plurality of CGR objects representing a game piece. The CGR file also includes data indicating actions of the plurality of CGR objects in response to detected triggers, e.g., when the collision of two game pieces is detected, the game pieces cease to be displayed.

Generating such a CGR file can be a difficult and time-consuming process, requiring expert knowledge in, for example, 3D object design and application coding. This presents a high barrier to the generation of quality CGR applications. Accordingly, in various implementations, a graphical user interface (GUI) is provided to simplify the generation of a CGR file that can be read (or executed) by a user device to present a CGR application including CGR content described by the CGR file. In particular, placing one or more CGR objects at desired locations and/or orientations in a CGR scene can be a cumbersome and/or confusing process. Accordingly, in various implementations, a GUI is provided that includes a spatial manipulation user interface element for spatially manipulating a CGR object within the CGR scene.

USER INTERFACES AND ASSOCIATED PROCESSES

Attention is now directed toward implementations of user interfaces ("UI") and associated processes that may be implemented on an electronic device, such as a portable multifunction device (PMD) 100 with a display, a touch-sensitive surface, and optionally one or more sensors to detect intensity of contacts with the touch-sensitive surface, or a device 300 with one or more processors, non-transitory memory, a display, and an input device.

FIGS. 8A-8Y illustrate example user interfaces for spatially manipulating CGR objects in a CGR scene in accordance with some implementations. The user interfaces in these figures are used to illustrate the processes described below, including the process in FIG. 9. Although some of the examples that follow will be given with reference to inputs on a touch-screen display (where the touch-sensitive surface and the display are combined), in some implementations, the device detects inputs on a touch-sensitive surface 451 that is separate from the display 450, as shown in FIG. 4B.

FIG. 8A illustrates a CGR scene manipulation user interface 801 displayed by a portable multifunctional device 100 (hereinafter "device 100"). In various implementations, the CGR scene manipulation user interface 801 is displayed by a CGR file composing application executed by the device 100.

The CGR scene manipulation user interface 801 includes a CGR scene (e.g., a three-dimensional space). The CGR scene manipulation user interface 801 includes a ground plane indicator 802 with a grid 803 overlaid thereon. The CGR scene manipulation user interface 801 includes a CGR mug 810 (e.g., a three-dimensional object in the three-dimensional space). In FIG. 8A, the CGR scene manipulation user interface 801 displays the CGR scene (and the CGR mug 810) from a first virtual camera perspective.

In various implementations, the CGR scene is associated with a global three-dimensional coordinate system including an x-direction (left-to-right in FIG. 8A), a y-direction (front-to-back in FIG. 8A), and a z-direction (up-and-down in FIG. 8A). In FIG. 8A, the CGR mug 810 is displayed at a first location within the CGR scene associated with an x-coordinate, a y-coordinate, and a z-coordinate of the global three-dimensional coordinate system.

FIG. 8A illustrates a user input 899A directed to the CGR mug 810. In various implementations, the user input 899A corresponds to a contact (e.g., a tap) detected at the location of the CGR mug 810.

Figure 8B:
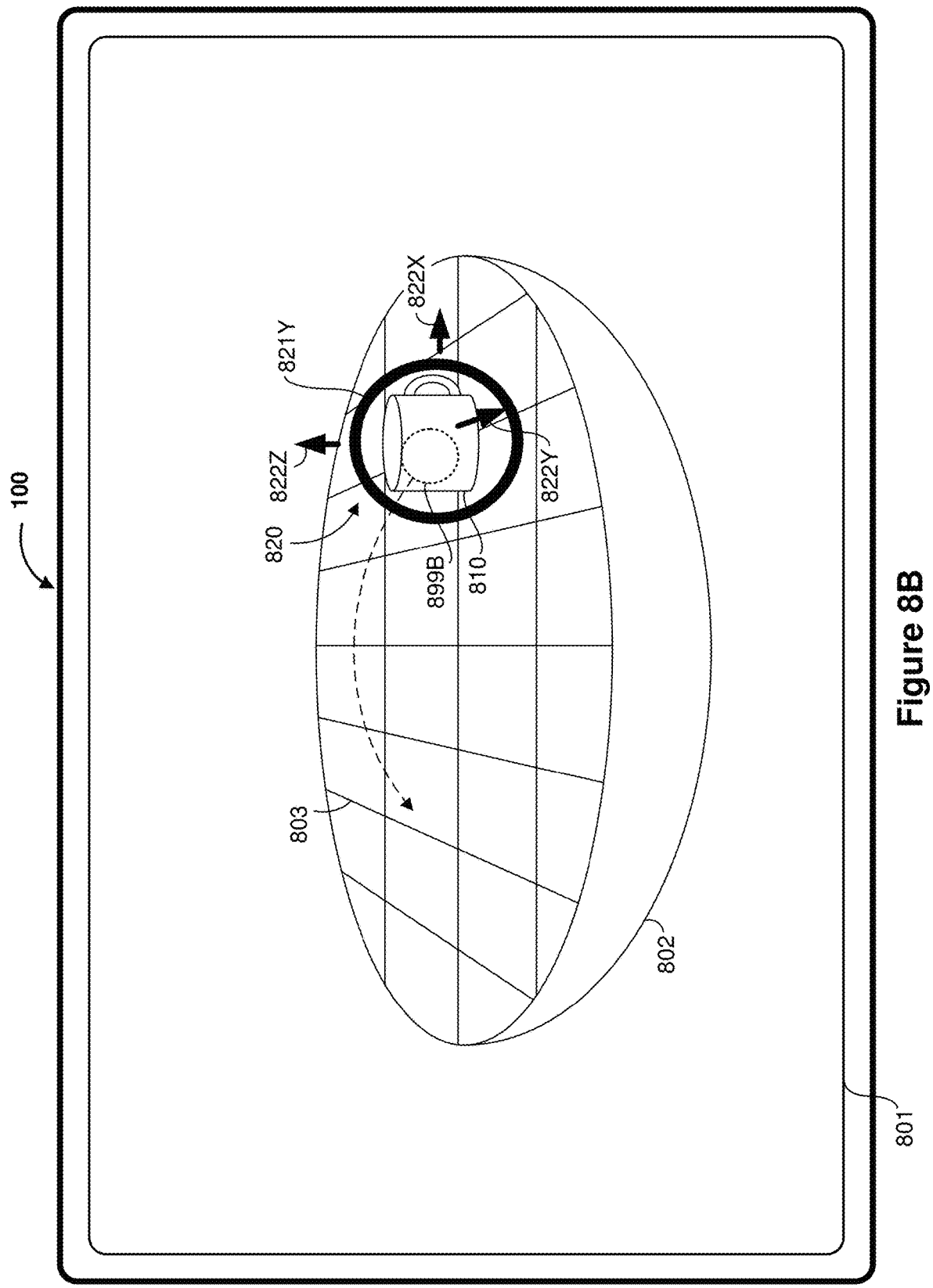

FIG. 8B illustrates the CGR scene manipulation user interface 801 in response to detecting the user input 899A directed to the CGR mug 810. In FIG. 8B, the CGR spatial manipulation user interface 801 includes a spatial manipulation user interface element 820 surrounding the CGR mug 810. The spatial manipulation user interface element 820 indicates that the CGR mug 810 is a selected CGR object. In FIG. 8B, the spatial manipulation user interface element 820 includes a first set of spatial manipulation affordances respectively associated with a first set of spatial manipulations.

In particular, in FIG. 8B, the spatial manipulation user interface element 820 includes a y-axis ring 821Y, an x-axis arrow 822X, a y-axis arrow 822Y, and a z-axis arrow 822Z. The y-axis ring 821Y is a spatial manipulation affordance for scaling (e.g., resizing) a selected CGR object, rotation of a selected CGR object about the y-axis, and two-dimensional translation of a selected CGR object within the xz-plane. In various implementations, the y-axis ring 821Y includes an edge (which is displayed as illustrated in FIG. 8B as a thick line) and an interior (within the edge). In various implementations, the edge is a spatial manipulation affordance for scaling a selected CGR object and rotation of a selected CGR object and the interior is a spatial manipulation affordance for two-dimensional translation of a selected CGR object. In various implementations, the spatial manipulation affordance for two-dimensional translation of a selected CGR object associated with the y-axis ring 821Y, while the y-axis ring 821Y is displayed, extends beyond the edge to encompass the selected CGR object.

The x-axis arrow 822X is a spatial manipulation affordance for one-dimensional translation of a selected CGR object along the x-axis. The x-axis arrow 822X is substantially aligned with the x-axis of the global three-dimensional coordinate system (at least including a point such that the center of the selected CGR object and the point define a line segment parallel with the x-axis), pointing towards positive or negative values of the x-coordinate. The y-axis arrow 822Y is a spatial manipulation affordance for one-dimensional translation of a selected CGR object along the y-axis. The y-axis arrow 822Y is substantially aligned with the y-axis of the global three-dimensional coordinate system (at least including a point such that the center of the selected CGR object and the point define a line segment parallel with the y-axis), pointing towards positive or negative values of the y-coordinate. The z-axis arrow 822Z is a spatial manipulation affordance for one-dimensional translation of a selected CGR object along the z-axis. The z-axis arrow 822Z is substantially aligned with the z-axis of the global three-dimensional coordinate system (at least including a point such that the center of the selected CGR object and the point define a line segment parallel with the z-axis), pointing towards positive or negative values of the z-coordinate.

In FIG. 8B, the spatial manipulation user interface element 820 does not include a z-axis ring 821Z (described below), a spatial manipulation affordance for, among other things, rotating a selected CGR object about the z-axis. The spatial manipulation user interface element 820 includes the y-axis ring 821Y (and not the z-axis ring 821Z) based on the first virtual camera perspective.

The device 100 determines whether the current virtual camera perspective is most normal to the xz-plane, the xy-plane, or the yz-plane of the global three-dimensional coordinate system. If the current virtual camera perspective is most normal to the xz-plane (as is the first virtual camera perspective of FIG. 8A), the spatial manipulation user interface element 820 includes the y-axis ring 821Y. If the current virtual camera perspective is most normal to the xy-plane (as is the second virtual camera perspective of FIG. 8M, described below), the spatial manipulation user interface element 820 includes the z-axis ring 821Z. If the current virtual camera perspective is most normal to the yz-plane, the spatial manipulation user interface element 820 includes an x-axis ring, a spatial manipulation affordance for, among other things, rotating a selected CGR object about the x-axis.

FIG. 8B illustrates a user input 899B directed to the interior of the y-axis ring 821Y. In various implementations, the user input 899B corresponds to a moving contact (e.g., a drag or touch-and-drag) detected with a start location at a location within the y-axis ring 821Y, an arcing path to a middle location both leftward and upward of the start location, and an end location further to the left of the start location.

Figure 8C:
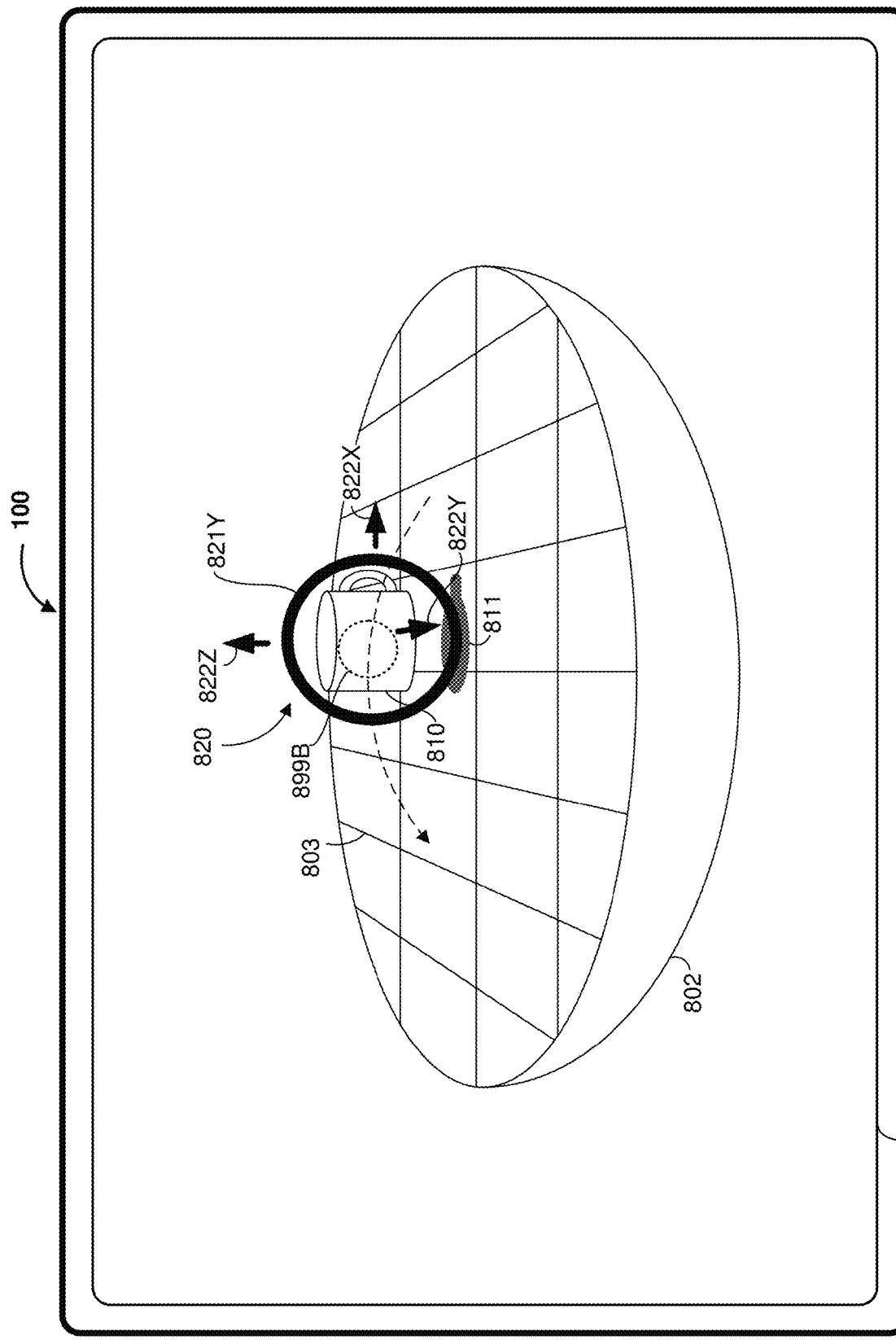

FIG. 8C illustrates the CGR scene manipulation user interface 801 in response to detecting a first portion of the user input 899B directed to the interior of the y-axis ring 821Y. In response to the first portion of the user input 899B, the contact moving on the screen both leftward and upward, the CGR mug 810 (and the surrounding spatial manipulation user interface element 820) are moved leftward and upward, corresponding to a change in location in the global three-dimensional coordinate system of the CGR mug 810 within the xz-plane (e.g., further to the left in the x-dimension and up in the z-dimension, as indicated by a shadow 811 displayed beneath the CGR mug 810).

Figure 8D:
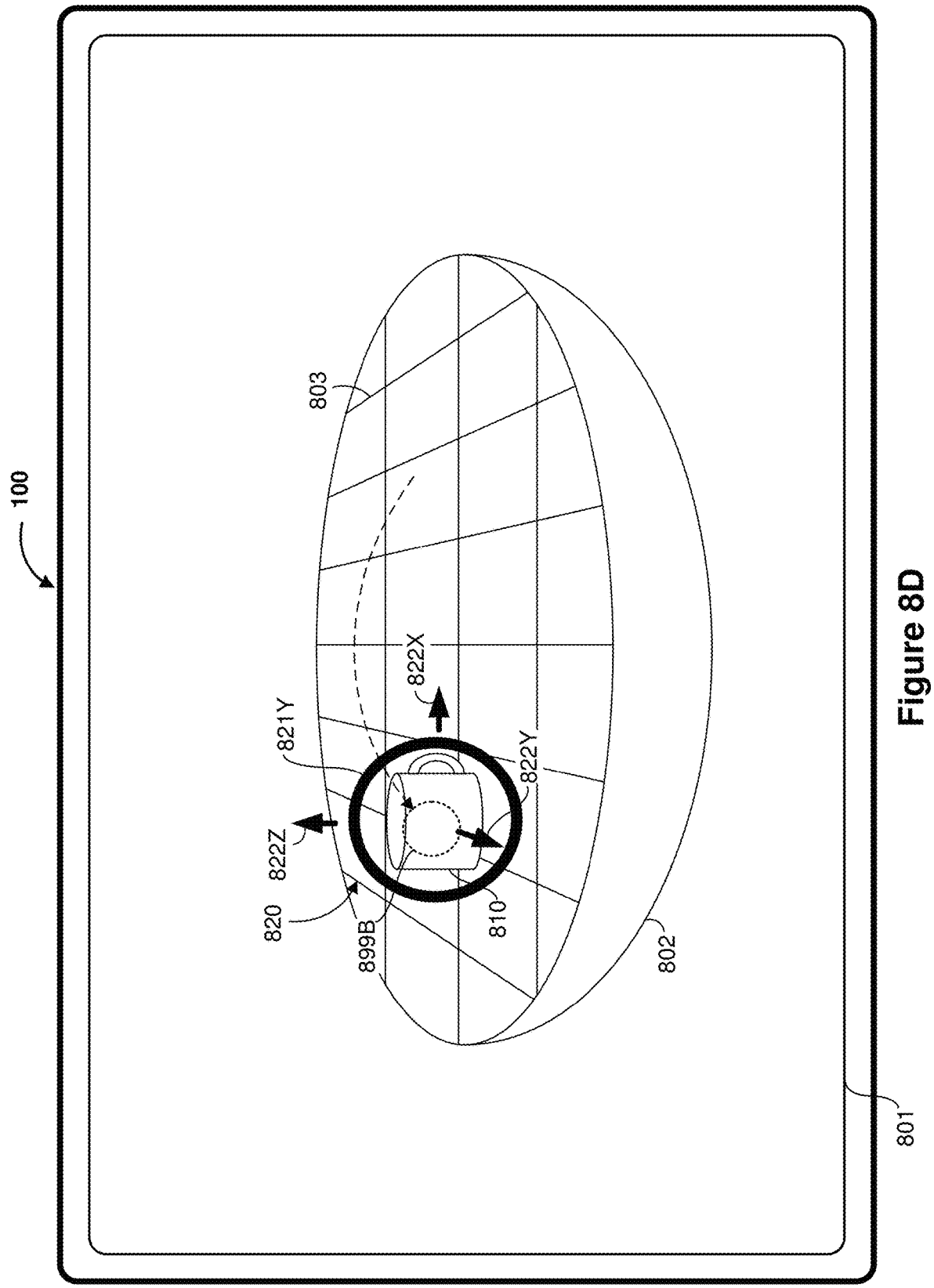

FIG. 8D illustrates the CGR scene manipulation user interface 801 in respect to detecting a second portion of the user input 899B directed to the interior of the y-axis ring 821Y. In response to the second portion of the user input 899B, the contact moving on the screen further leftward and back downward, the CGR mug 810 (and the surrounding spatial manipulation user interface element 820) are moved leftward and downward, corresponding to a further change in location in the global three-dimensional coordinate system of the CGR mug 810 within the xz-plane (e.g., further to the left in the x-dimension and back down in the z-dimension).

Figure 8E:
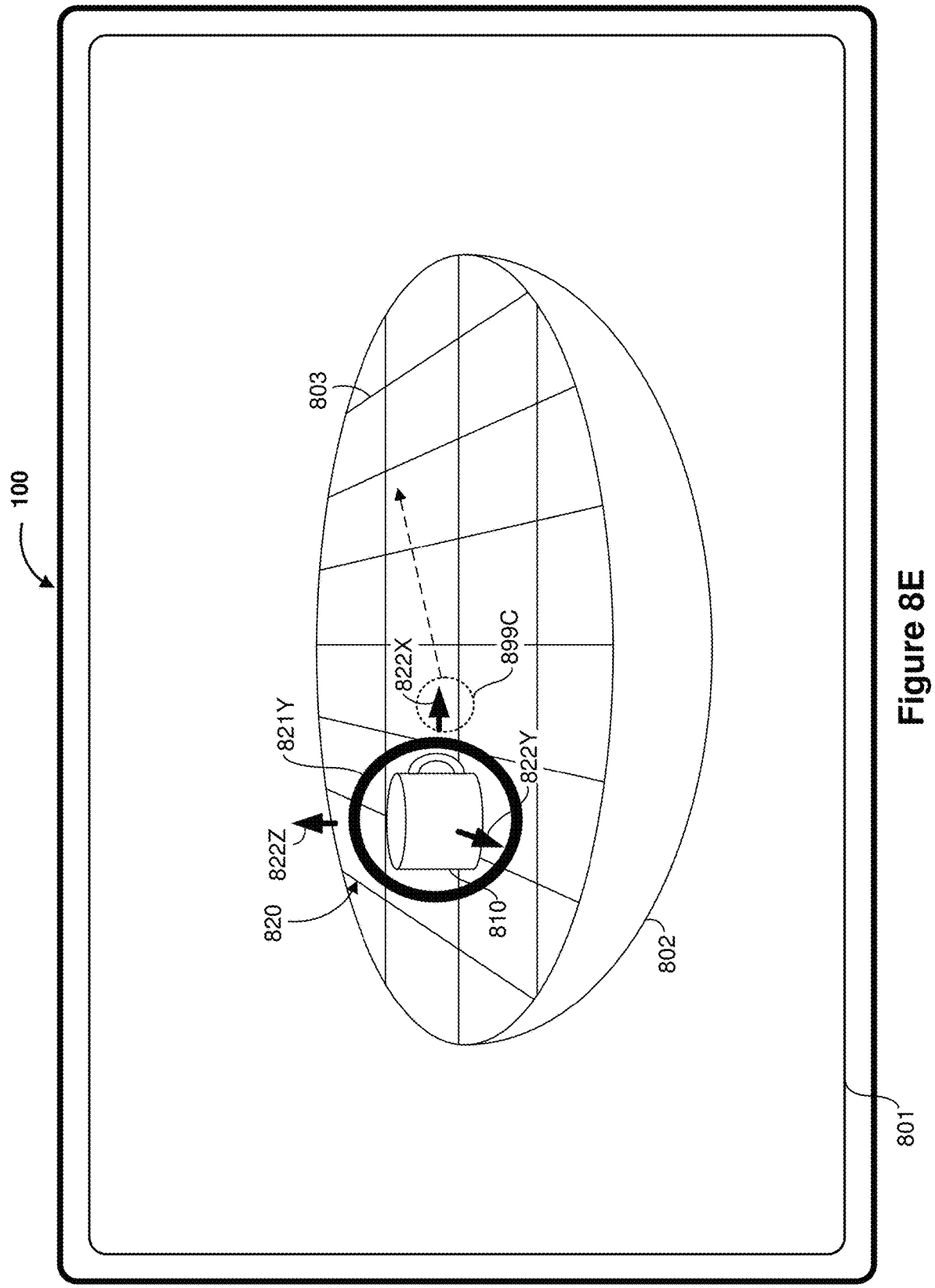

FIG. 8E illustrates the CGR scene manipulation user interface of FIG. 8D with a user input 899C directed to the x-axis arrow 822X. In various implementations, the user input 899C corresponds to a moving contact (e.g., a drag or touch-and-drag) detected with a start location at the location of the x-axis arrow 822X, a straight path to a middle location both rightward and upward of the start location, and an end location further to rightward and upward of the middle location.

Figure 8F:
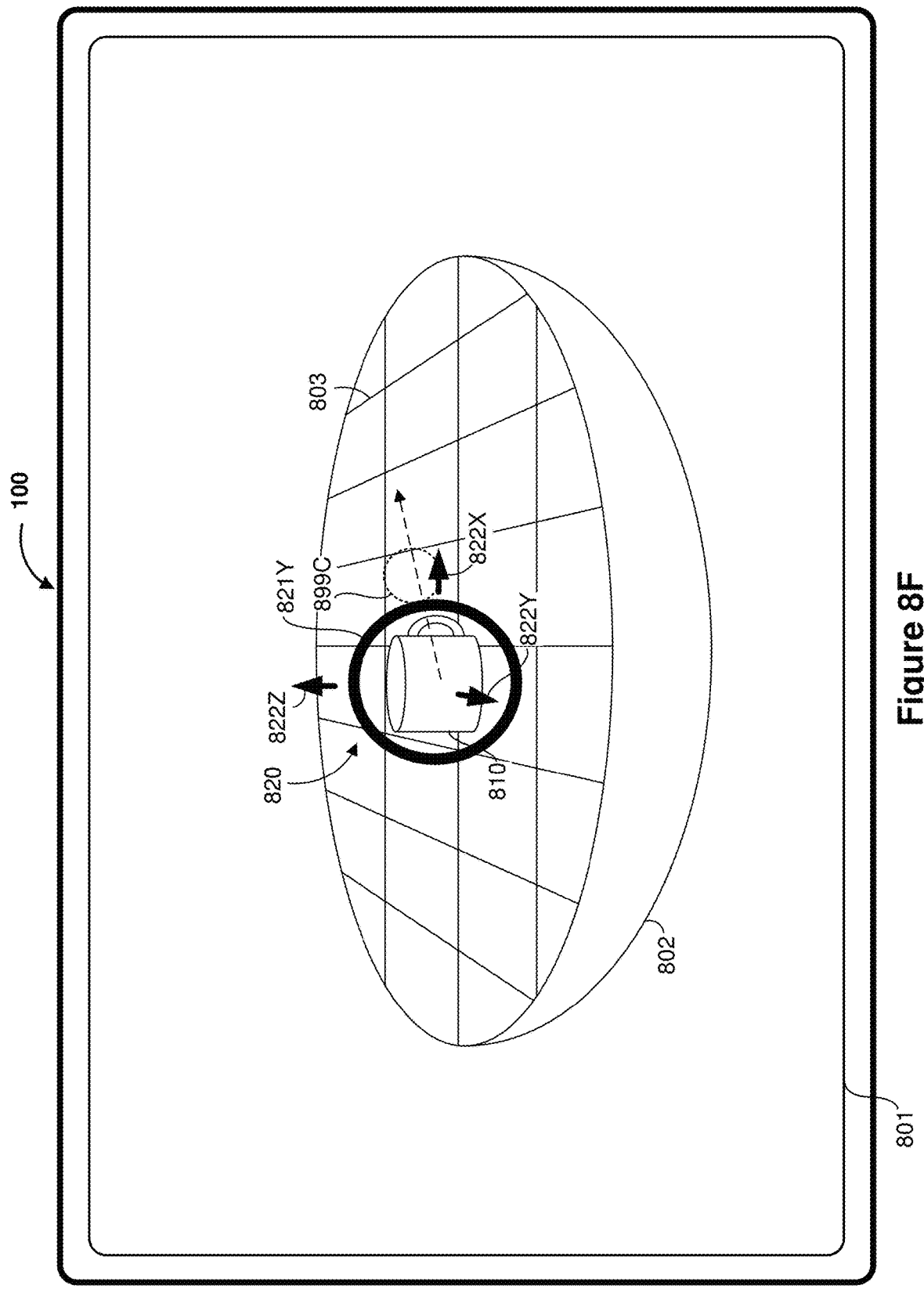

FIG. 8F illustrates the CGR scene manipulation user interface 801 in response to detecting a first portion of the user input 899C directed to the x-axis arrow 822X. In response to the first portion of the user input 899C, the contact moving on the screen both rightward and upward, the CGR mug 810 (and the surrounding spatial manipulation user interface element 820) are moved rightward only (e.g., not upward), corresponding to a change in location in the global three-dimensional coordinate system of the CGR mug 810 along the x-axis (e.g., further to the right in the x-dimension).

Figure 8G:
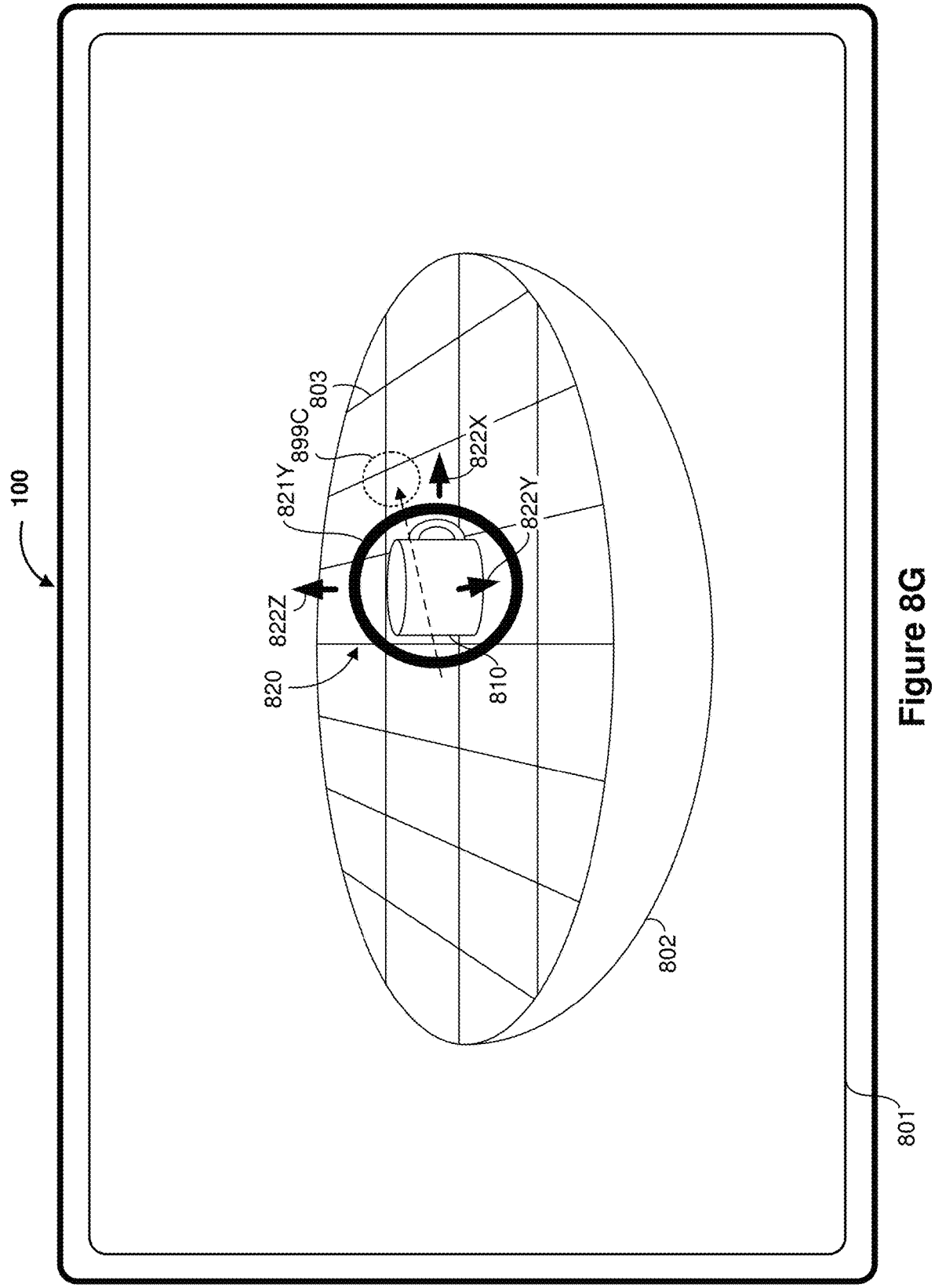

FIG. 8G illustrates the CGR scene manipulation user interface 801 in response to detecting a second portion of the user input 899C directed to the x-axis arrow 822X. In response to the second portion of the user input 899C, the contact moving on the screen further rightward and upward, the CGR mug 810 (and the surrounding spatial manipulation user interface element 820) are moved rightward only (e.g., not upward), corresponding to a further change in location in the global three-dimensional coordinate system of the CGR mug 810 along the x-axis (e.g., further to the right in the x-dimension).

Thus, unlike the upward and downward component of the user input 899B directed to the interior of the y-axis ring 821Y, the upward component of the user input 899C directed to the x-axis arrow 822X does not change the vertical location of the CGR mug 810 within the CGR scene manipulation user interface 801 or the z-coordinate of the CGR mug 810 within the global three-dimensional coordinate system. Thus, rather than two-dimensional translation within the xz-plane as in response to the user input 899B, the CGR mug 810 undergoes one-dimensional translation along the x-axis in response to the user input 899C.

Figure 8H:
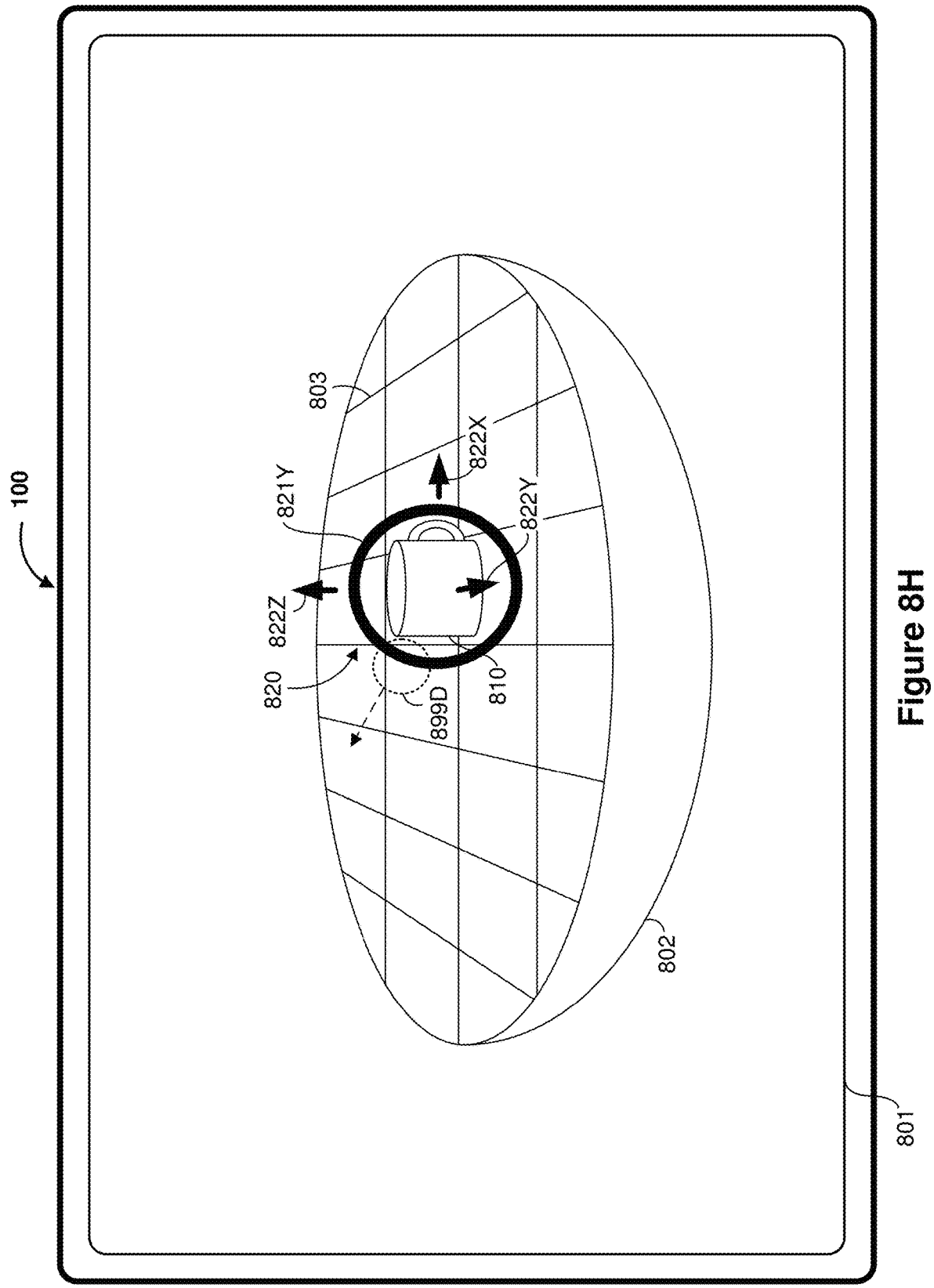

FIG. 8H illustrates the CGR scene manipulation user interface 801 of FIG. 8G with a user input 899D directed to an edge of the y-axis ring 821Y. In various implementations, the user input 899D corresponds to a moving contact (e.g., a drag or touch-and-drag) detected with a start location at the location of the edge of the y-axis ring 821Y a first distance from the center of the y-axis ring 821Y and an end location a second distance from the center of the y-axis ring 821Y.

Figure 8I:
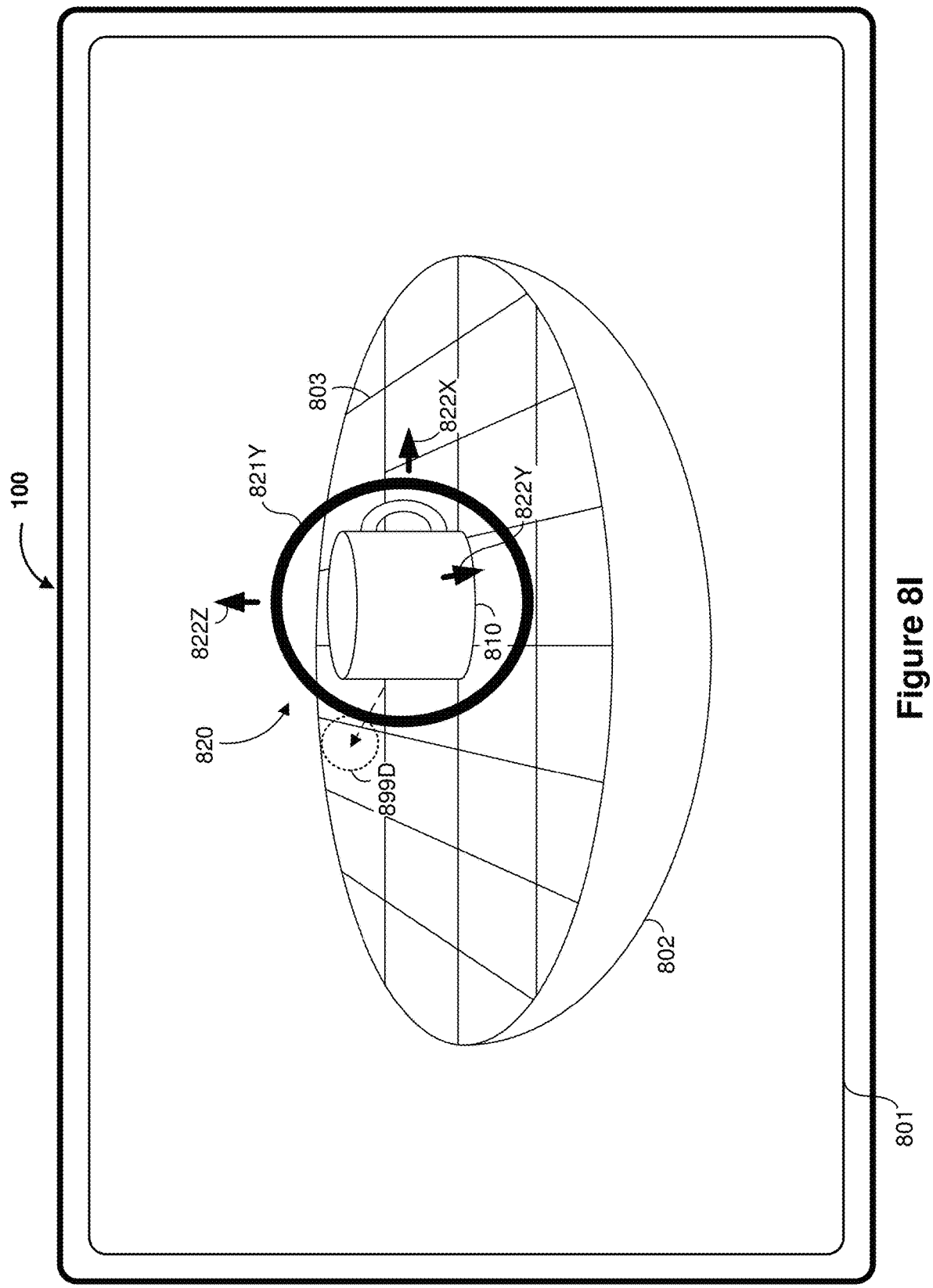

FIG. 8I illustrates the CGR scene manipulation user interface 801 in response to detecting the user input 899D directed to the edge of the y-axis ring 821Y. In FIG. 8I, the CGR mug 810 (and the surrounding spatial manipulation user interface element 820) is scaled, e.g., increased in size. In various implementations, a user input moving away from the center of the y-axis ring 821Y (e.g., the user input 899D) increases the size of the CGR mug 810, wherein a user input moving towards the center of the y-axis ring 821Y decreases the size of the CGR mug 810.

Figure 8J:
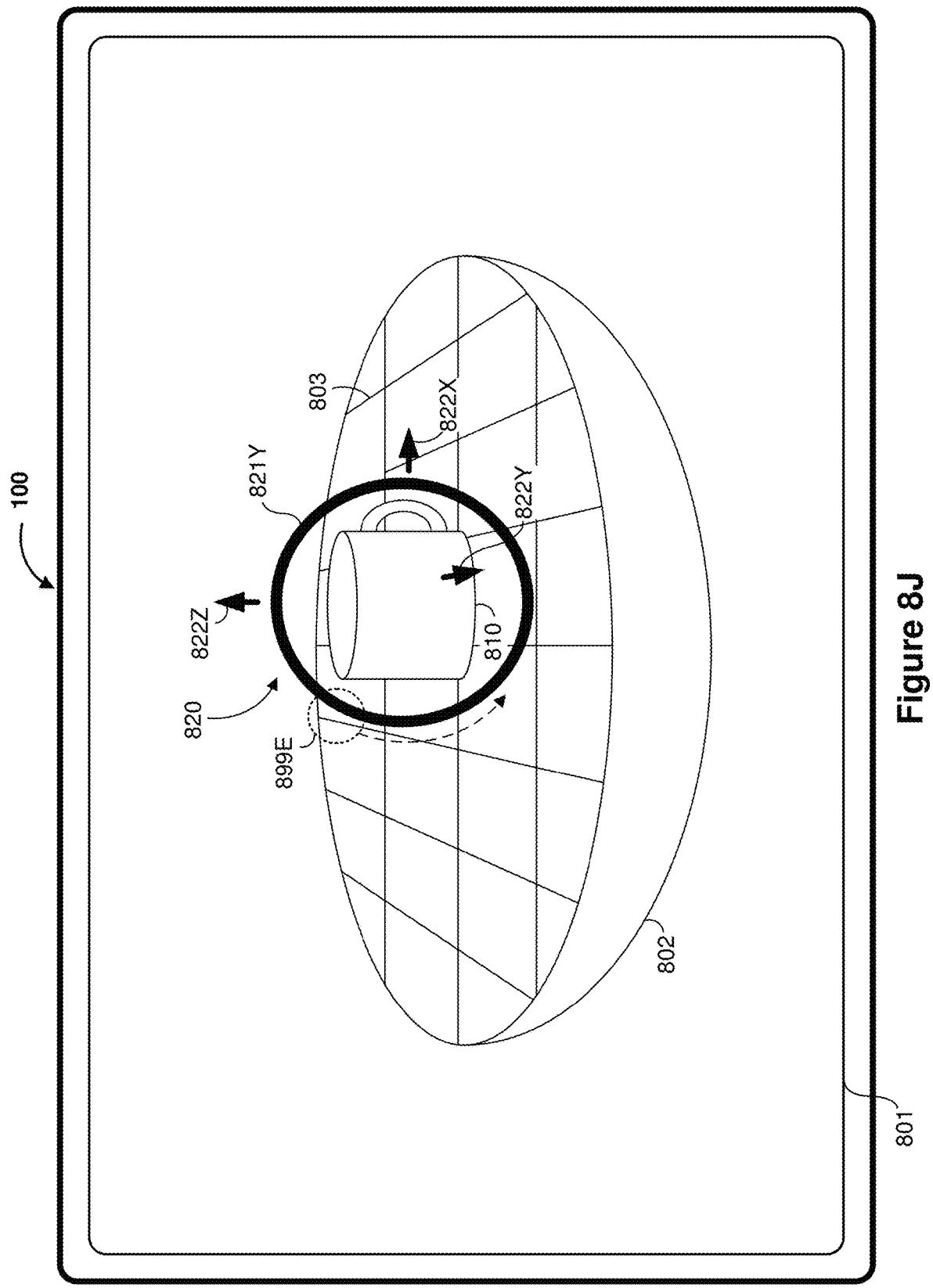

FIG. 8J illustrates the CGR scene manipulation user interface 801 of FIG. 8I with a user input 899E directed to the edge of the y-axis ring 821Y. In various implementations, the user input 899E corresponds to a moving contact (e.g., a drag or touch-and-drag) detected with a start location at the location of the edge of the y-axis ring 821Y and moving along the y-axis ring 821Y (e.g., beginning perpendicular to a line between the start location and the center of the y-axis ring 821Y).

FIG. 8K1 illustrates the CGR scene manipulation user interface 801 in response to detecting the user input 899E directed to the edge of the y-axis ring 821Y. In FIG. 8K1, the CGR mug 810 (but not the spatial manipulation user interface element 820) is rotated about the y-axis. Because rotation of the CGR mug 810 does not change the global three-dimensional coordinate system, the spatial manipulation user interface element 820 is unchanged. However, in various implementations, the spatial manipulation user interface 820 is not aligned with the global three-dimensional coordinate system, but rather a local three-dimensional coordinate system of the selected CGR object.

FIG. 8K2 illustrates the CGR scene manipulation user interface 801 in response to detecting the user input 899E with an alternative spatial manipulation user interface element 829 which is aligned with a local three-dimensional coordinate system of the CGR mug 810. The local three-dimensional coordinate system includes an x-axis aligned with the center of the CGR mug 810 and its handle, a z-axis aligned with the center of the CGR mug 810 and its top and bottom, and a y-axis perpendicular to both the x-axis and the z-axis. Accordingly, in FIG. 8K2, in response to detecting the user input 899E, the CGR mug 810 (and the spatial manipulation user interface element 820) is rotated about the y-axis.

The x-axis arrow 822X in FIG. 8K2 (as in FIG. 8J) is substantially aligned with the x-axis of the local three-dimensional coordinate system (at least including a point such that the center of the CGR mug 810 and the point define a line segment parallel with the x-axis). The y-axis arrow 822Y and the z-axis arrow 822Z are similarly aligned.

Figure 8L:
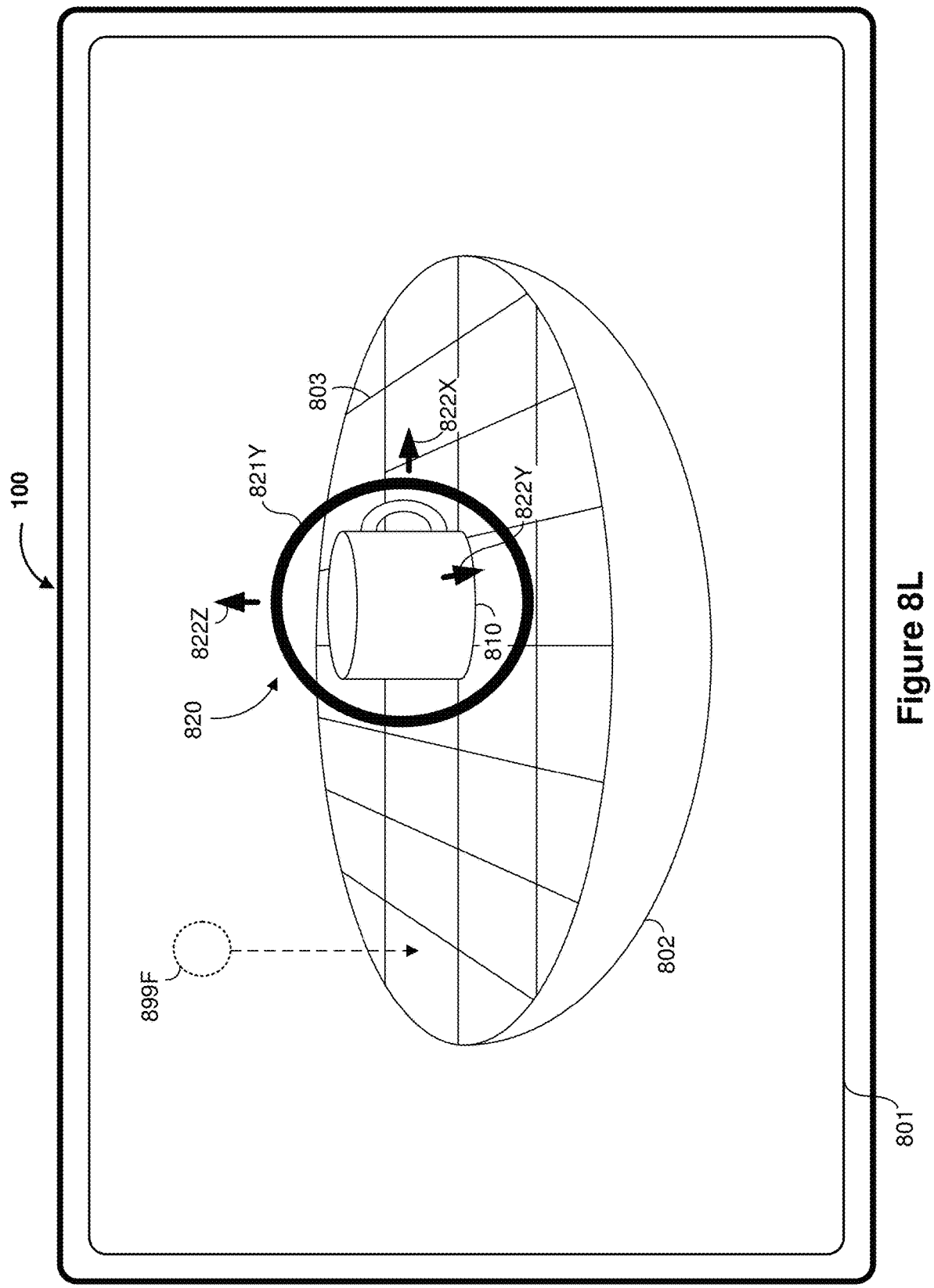

FIG. 8L illustrates the CGR scene manipulation user interface 801 of FIG. 8J with a user input 899F directed to a location away from the spatial manipulation user interface element 820. In various implementations, the user input 899F corresponds to a moving contact (e.g., a drag or touch-and-drag) detected with a start location at the location away from the spatial manipulation user interface element 820 and an end location downward from the start location.

Figure 8M:
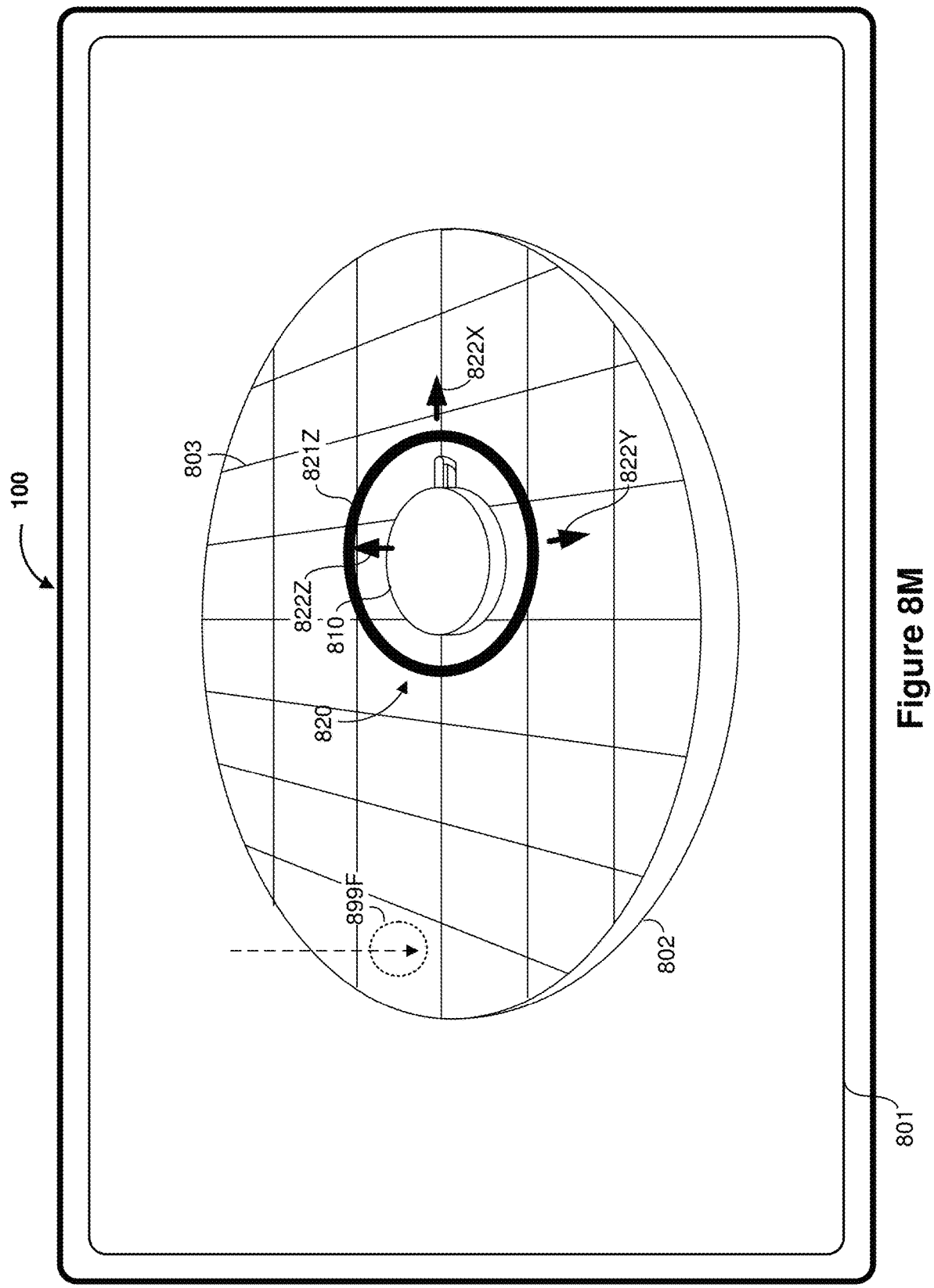

FIG. 8M illustrates the CGR scene manipulation user interface 801 in response to detecting the user input 899F directed to the location away from the spatial manipulation user interface element 820. In FIG. 8M, the CGR scene manipulation user interface 801 includes the CGR scene displayed from a second virtual camera perspective (different from the first virtual camera perspective of FIGS. 8A-8L).

As noted above, the device 100 determines whether the current virtual camera perspective is most normal to the xz-plane, the xy-plane, or the yz-plane of the global three-dimensional coordinate system. If the current virtual camera perspective is most normal to the xz-plane (as is the first virtual camera perspective of FIG. 8A, described above), the spatial manipulation user interface element 820 includes the y-axis ring 821Y. If the current virtual camera perspective is most normal to the xy-plane (as is the second virtual camera perspective of FIG. 8M), the spatial manipulation user interface element 820 includes the z-axis ring 821Z. If the current virtual camera perspective is most normal to the yz-plane, the spatial manipulation user interface element 820 includes an x-axis ring, a spatial manipulation affordance for, among other things, rotating a selected CGR object about the x-axis.

In response to the change in virtual camera perspective, the spatial manipulation user interface element 820 is also changed. The spatial manipulation user interface element 820 no longer includes the y-axis ring 821Y, but the spatial manipulation user interface element 820 does include a z-axis ring 821Z. The z-axis ring 821Z is a spatial manipulation affordance for scaling (e.g., resizing) a selected CGR object, rotation of a selected CGR object about the y-axis, and two-dimensional translation of a selected CGR object within the xy-plane. In various implementations, the z-axis ring 821Z includes an edge (which is displayed as illustrated in FIG. 8M as a thick line) and an interior (within the edge). In various implementations, the edge is a spatial manipulation affordance for scaling a selected CGR object and rotation of a selected CGR object and the interior is a spatial manipulation affordance for two-dimensional translation of a selected CGR object. In various implementations, the spatial manipulation affordance for two-dimensional translation of a selected CGR object associated with the z-axis ring 821Z, while the z-axis ring 821Z is displayed, extends beyond the edge to encompass the selected CGR object.

Thus, in FIG. 8M, the spatial manipulation user interface element 820 includes a second set of spatial manipulation affordances respectively associated with a second set of spatial manipulations. The first set of spatial manipulations includes at least one spatial manipulation (e.g., rotation about the y-axis or two-dimensional translation in the xz-plane using the y-axis ring 821Y) excluded from the second set of spatial manipulations and the second set of spatial manipulations includes at least one spatial manipulation excluded from the first set of spatial manipulations (e.g., rotation about the z-axis or two-dimensional translation in the xy-plane using the z-axis ring 821Z).

Figure 8N:
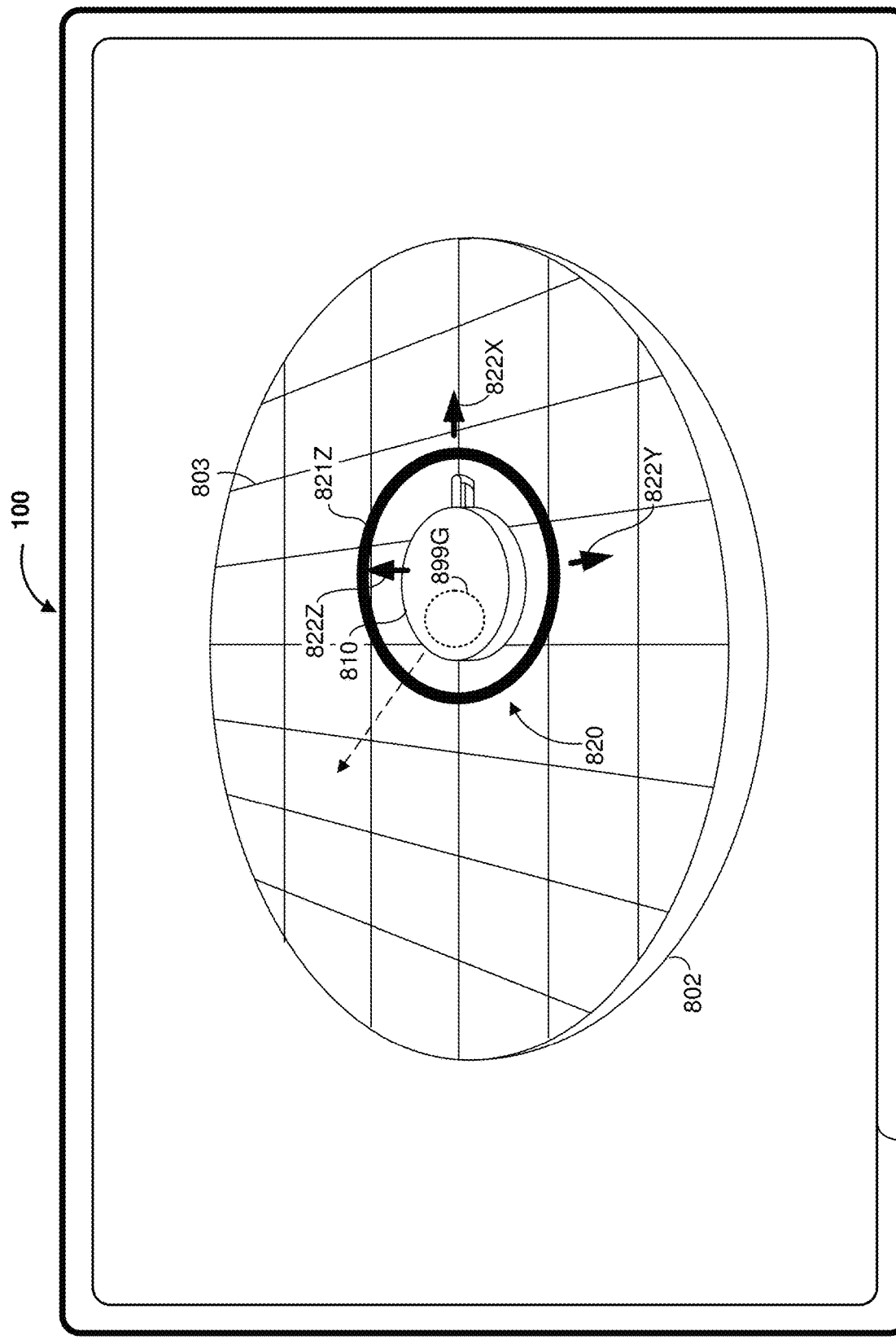

FIG. 8N illustrates the CGR spatial manipulation user interface 801 of FIG. 8M with a user input 899G directed to the interior of the z-axis ring 821Z. In various implementations, the user input 899G corresponds to a moving contact (e.g., a drag or touch-and-drag) detected with a start location at a location within the z-axis ring 821Z and an end location leftward and upward of the start location.

Figure 8O:
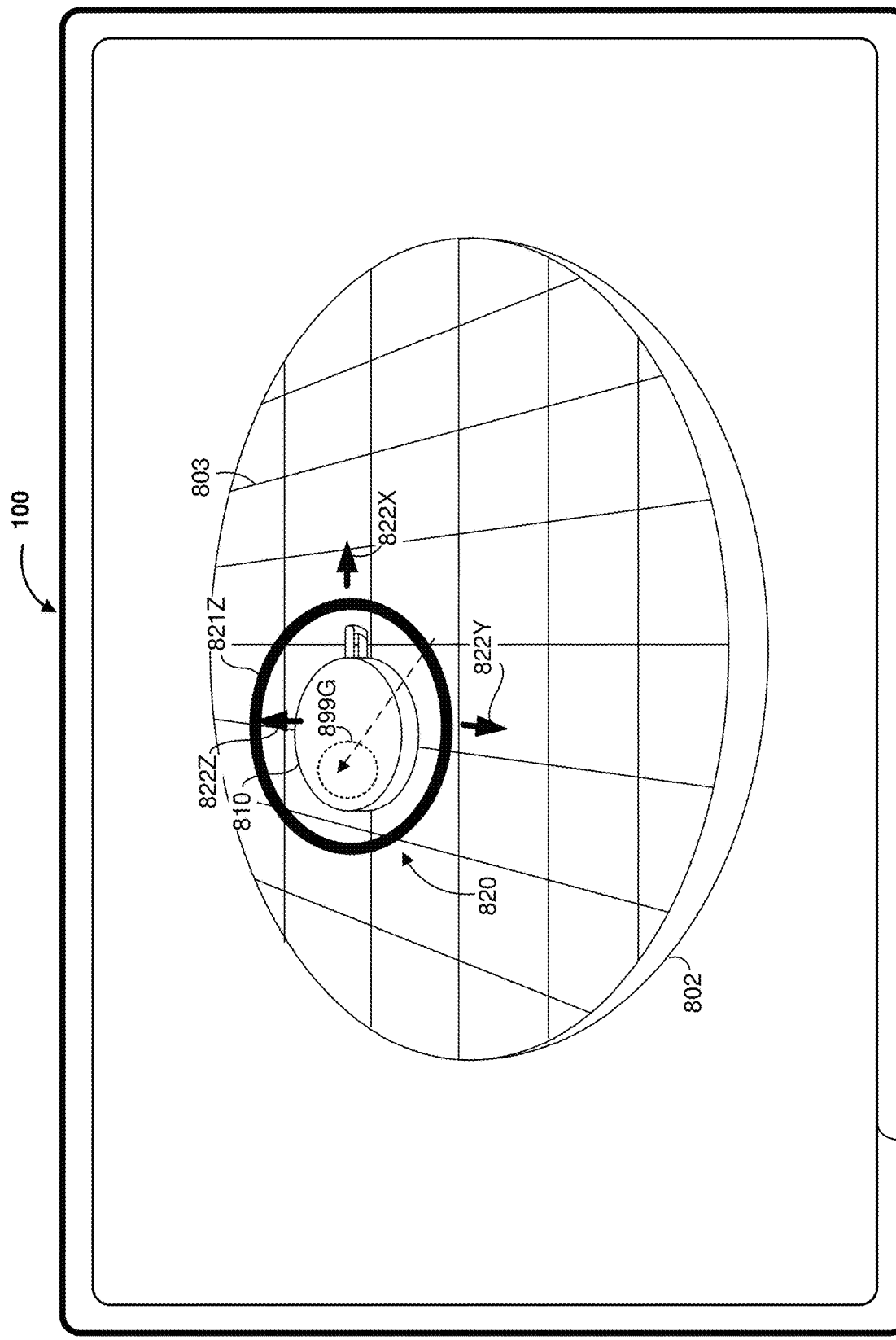

FIG. 8O illustrates the CGR scene manipulation user interface 801 in response to detecting the user input 899G directed to the interior of the z-axis ring 821Z. In response to the user input 899B, the CGR mug 810 (and the surrounding spatial manipulation user interface element 820) are moved leftward and upward, corresponding to a change in location in the global three-dimensional coordinate system of the CGR mug 810 within the xy-plane (e.g., leftward in the x-dimension and backward in the y-dimension). The z-dimension of the CGR mug 810 is unchanged.

Figure 8P:
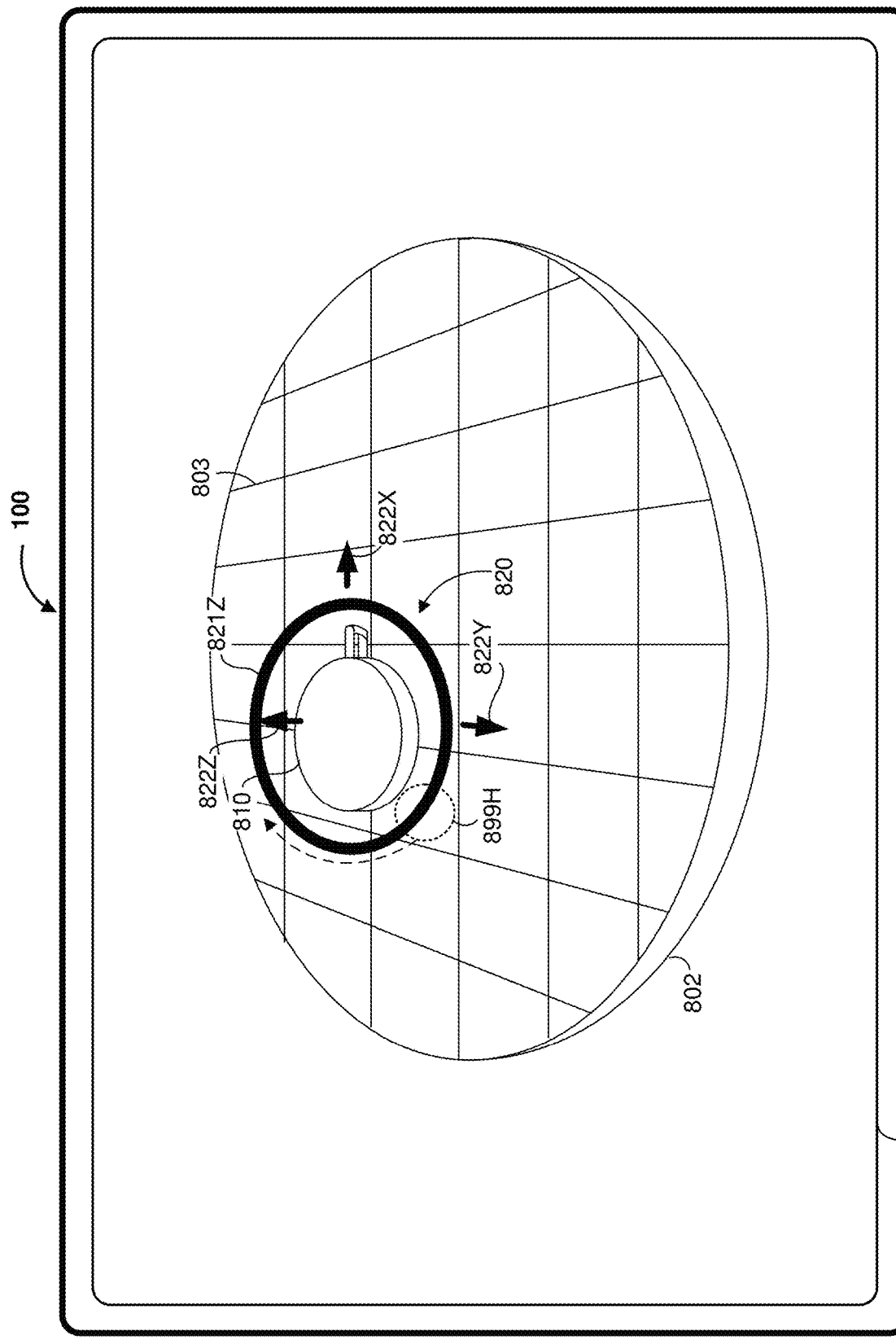

FIG. 8P illustrates the CGR scene manipulation user interface 801 of FIG. 8O with a user input 899H directed to the edge of the z-axis ring 821Z. In various implementations, the user input 899H corresponds to a moving contact (e.g., a drag or touch-and-drag) detected with a start location at the location of the edge of the z-axis ring 821Z and moving along the z-axis ring 821Z (e.g., beginning perpendicular to a line between the start location and the center of the z-axis ring 821Z).

FIG. 8Q1 illustrates the CGR scene manipulation user interface 801 in response to detecting the user input 899H directed to the edge of the z-axis ring 821Z. In FIG. 8Q1, the CGR mug 810 (but not the spatial manipulation user interface element 820) is rotated about the z-axis. Because rotation of the CGR mug 810 does not change the global three-dimensional coordinate system, the spatial manipulation user interface element 820 is unchanged. However, in various implementations, the spatial manipulation user interface 820 is not aligned with the global three-dimensional coordinate system, but rather a local three-dimensional coordinate system of the selected CGR object.

FIG. 8Q2 illustrates the CGR scene manipulation user interface 801 in response to detecting the user input 899H with the alternative spatial manipulation user interface element 829 which is aligned with the local three-dimensional coordinate system of the CGR mug 810. Accordingly, in FIG. 8Q2, in response to detecting the user input 899H, the CGR mug 810 (and the spatial manipulation user interface element 820) is rotated about the z-axis.

Figure 8R:
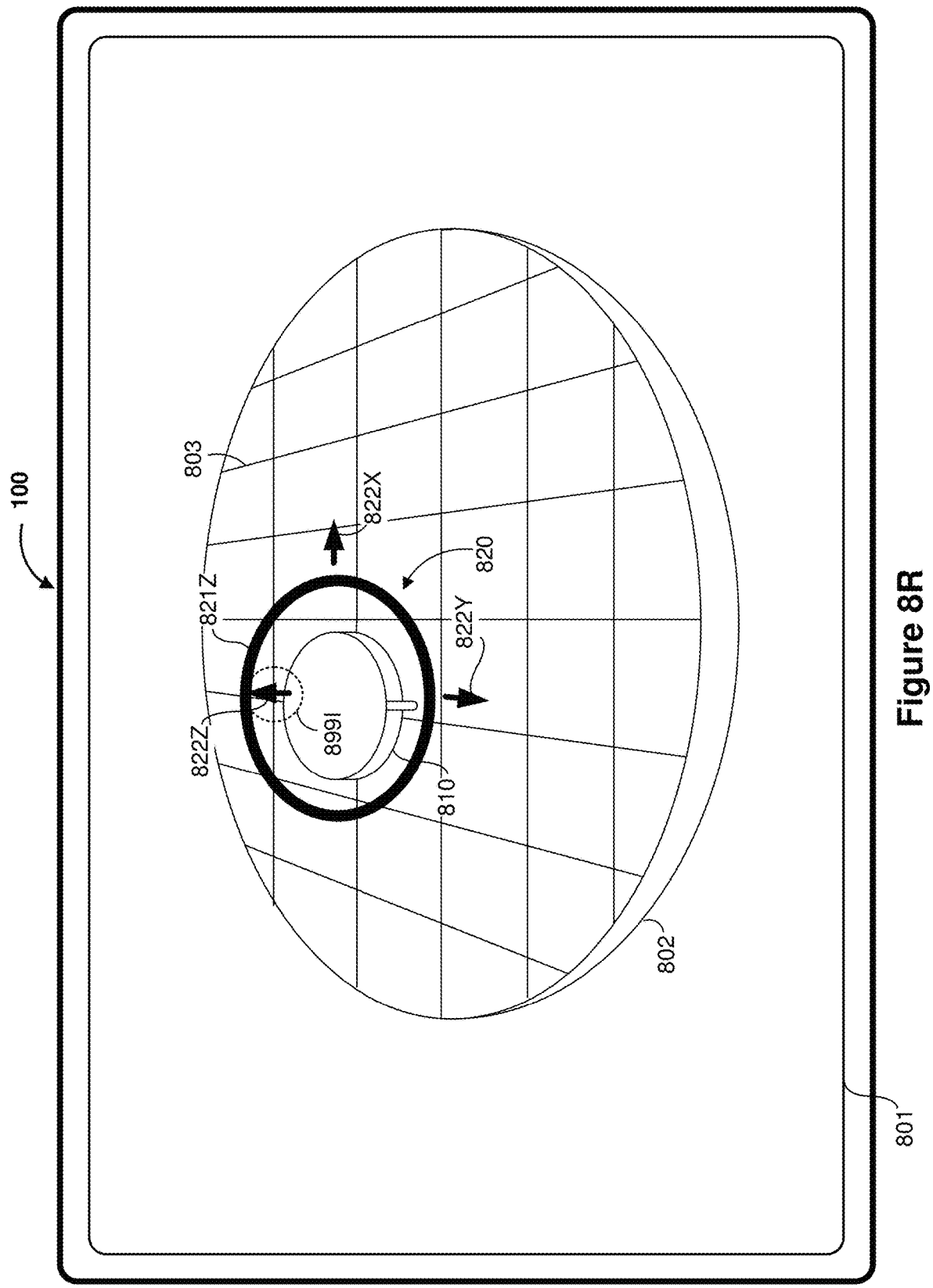

FIG. 8R illustrates the CGR scene manipulation user interface 801 of FIG. 8Q1 with a user input 899I directed to the z-axis arrow 822Z. In various implementations, the user input 899I corresponds to a contact (e.g., a tap) detected at the location of the z-axis arrow 822Z.

Figure 8S:
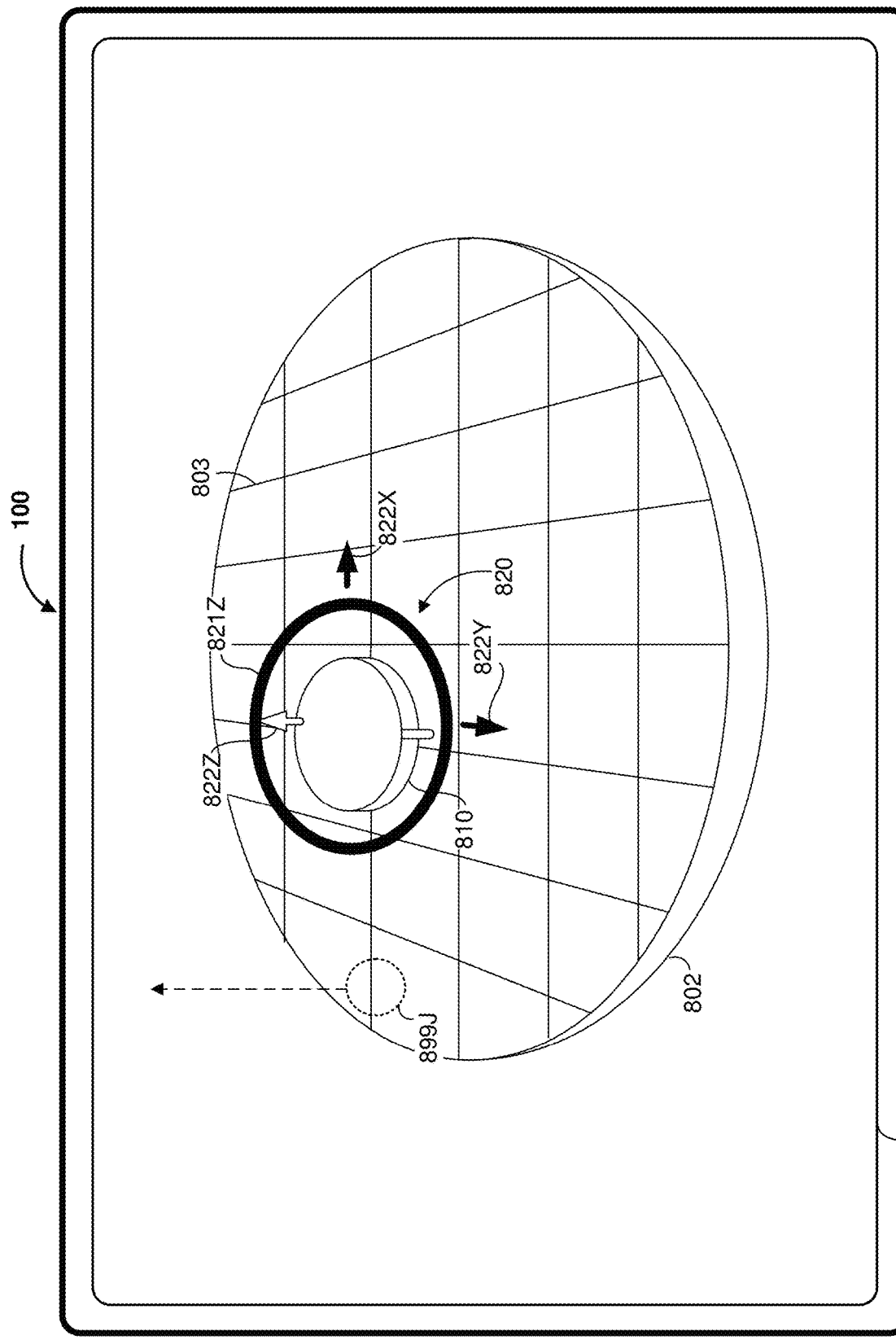

FIG. 8S illustrates the CGR scene manipulation user interface 801 in response to detecting the user input 899I directed to the z-axis arrow 822Z. In FIG. 8S, the z-axis arrow 822Z is displayed in a different manner than in FIG. 8R (e.g., highlighted, a different color, a different size, a different brightness, etc.) indicating that the spatial manipulation user interface element 820 is locked to the z-axis. Accordingly, a change in virtual camera perspective does not change the set of spatial manipulation affordances of the spatial manipulation user interface element 820.

FIG. 8S illustrates a user input 899J directed to a location away from the spatial manipulation user interface element 820. In various implementations, the user input 899J corresponds to a moving contact (e.g., a drag or touch-and-drag) detected with a start location at the location away from the spatial manipulation user interface element 820 and an end location upward from the start location.

Figure 8T:
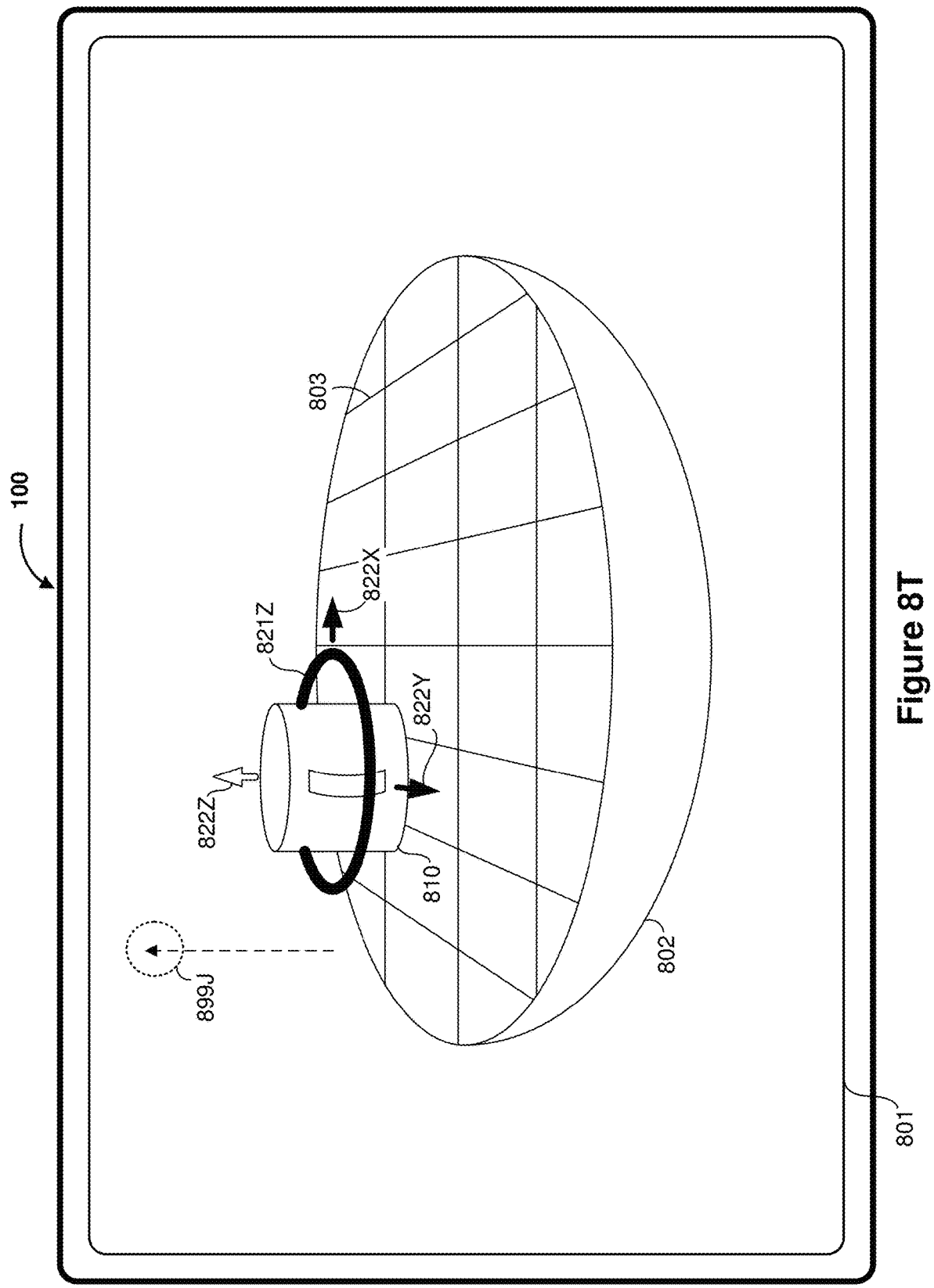

FIG. 8T illustrates the CGR scene manipulation user interface 801 in response to detecting the user input 899J directed to the location away from the spatial manipulation user interface element 820. In FIG. 8T, the CGR scene manipulation user interface 801 includes the CGR scene displayed from the first virtual camera perspective (of FIGS. 8A-8L, different from the second virtual camera perspective of FIG. 8M-8S).

As described above, in various implementations, the device 100 determines whether the current virtual camera perspective is most normal to the xz-plane, the xy-plane, or the yz-plane of the global three-dimensional coordinate system and displays a corresponding ring. However, when the spatial manipulation user interface element is locked to an axis, the corresponding ring is displayed regardless of the virtual camera perspective.

Thus, in FIG. 8T, even though the first virtual camera perspective is most normal to the xz-plane (and the y-axis ring 821Y would be displayed if the spatial manipulation user interface element 820 were not locked), the spatial manipulation user interface element 820 includes the z-axis ring 821Z.

Figure 8U:
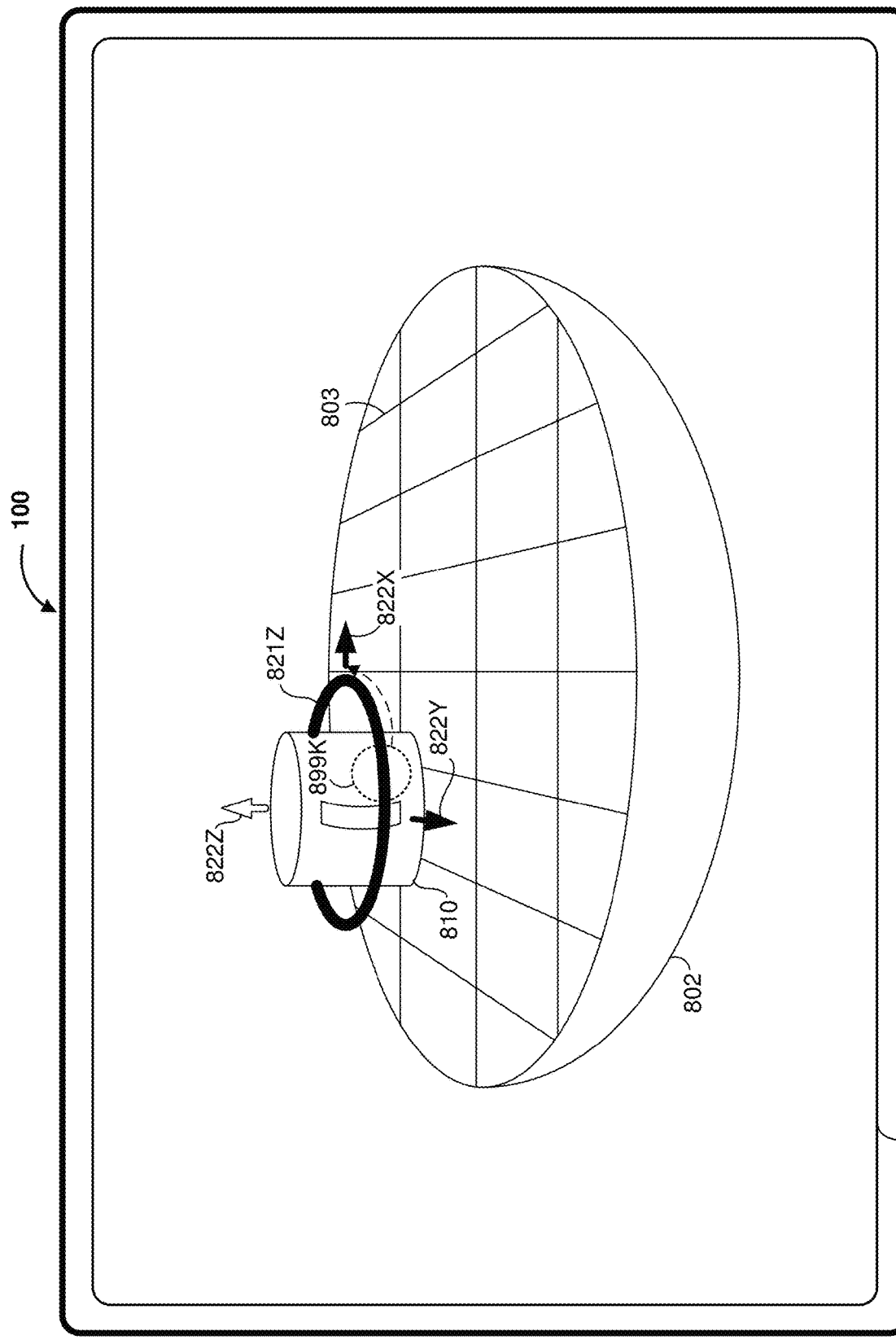

FIG. 8U illustrates the CGR scene manipulation user interface 801 with a user input 899K directed to the edge of the z-axis ring 821Z. In various implementations, the user input 899K corresponds to a moving contact (e.g., a drag or touch-and-drag) detected with a start location at the location of the edge of the z-axis ring 821Z and moving along the z-axis ring 821Z (e.g., beginning perpendicular to a line between the start location and the center of the z-axis ring 821Z).

Figure 8V:
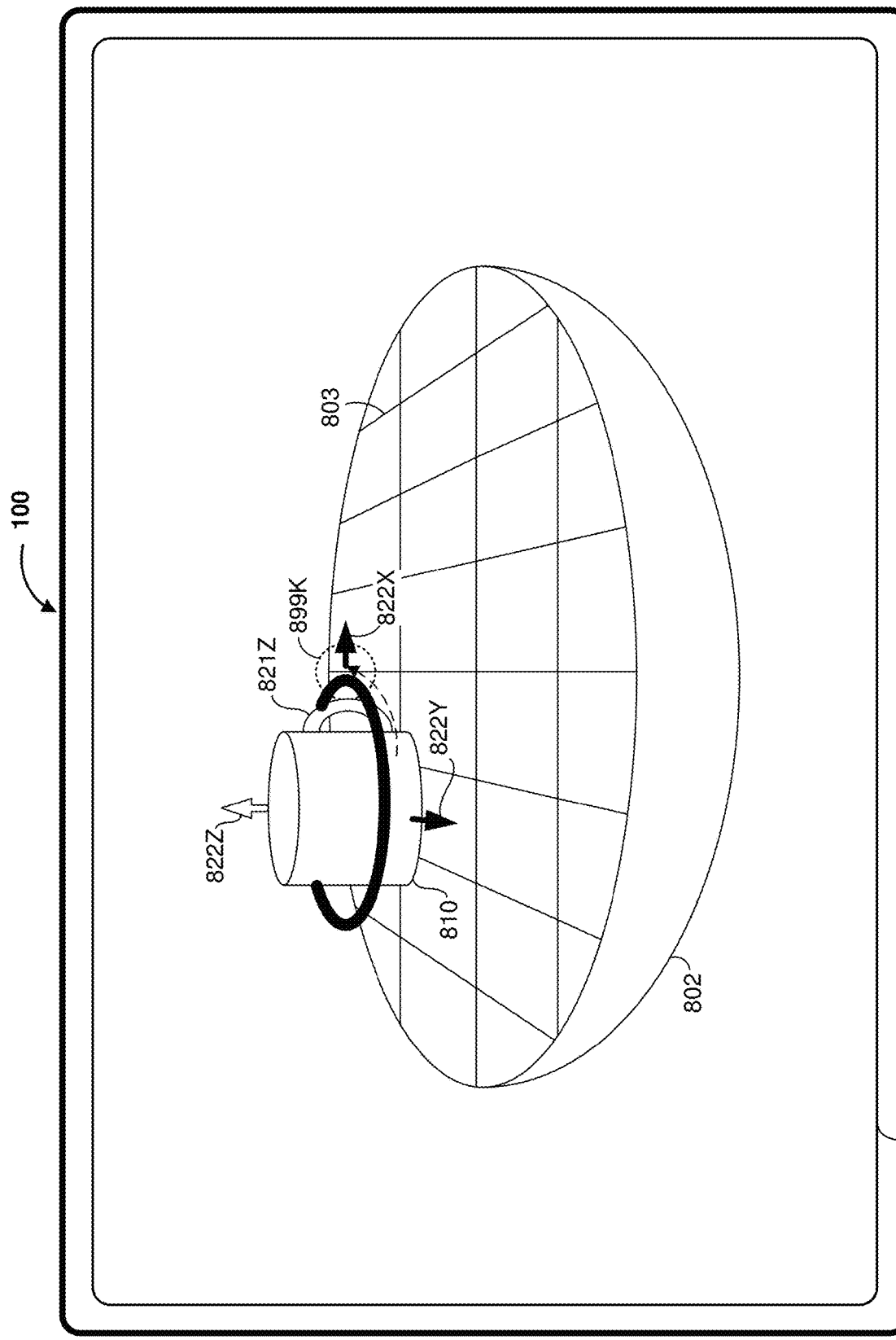

FIG. 8V illustrates the CGR scene manipulation user interface 801 in response to detecting the user input 899K directed to the edge of the z-axis ring 821Z. In FIG. 8V, the CGR mug 810 (but not the spatial manipulation user interface element 820) is rotated about the z-axis.

FIG. 8W illustrates the CGR scene manipulation user interface 801 of FIG. 8V with a user input 899L directed to the x-axis arrow 822X. In various implementations, the user input 899L corresponds to a contact (e.g., a tap) detected at the location of the x-axis arrow 822X.

Figure 8X:
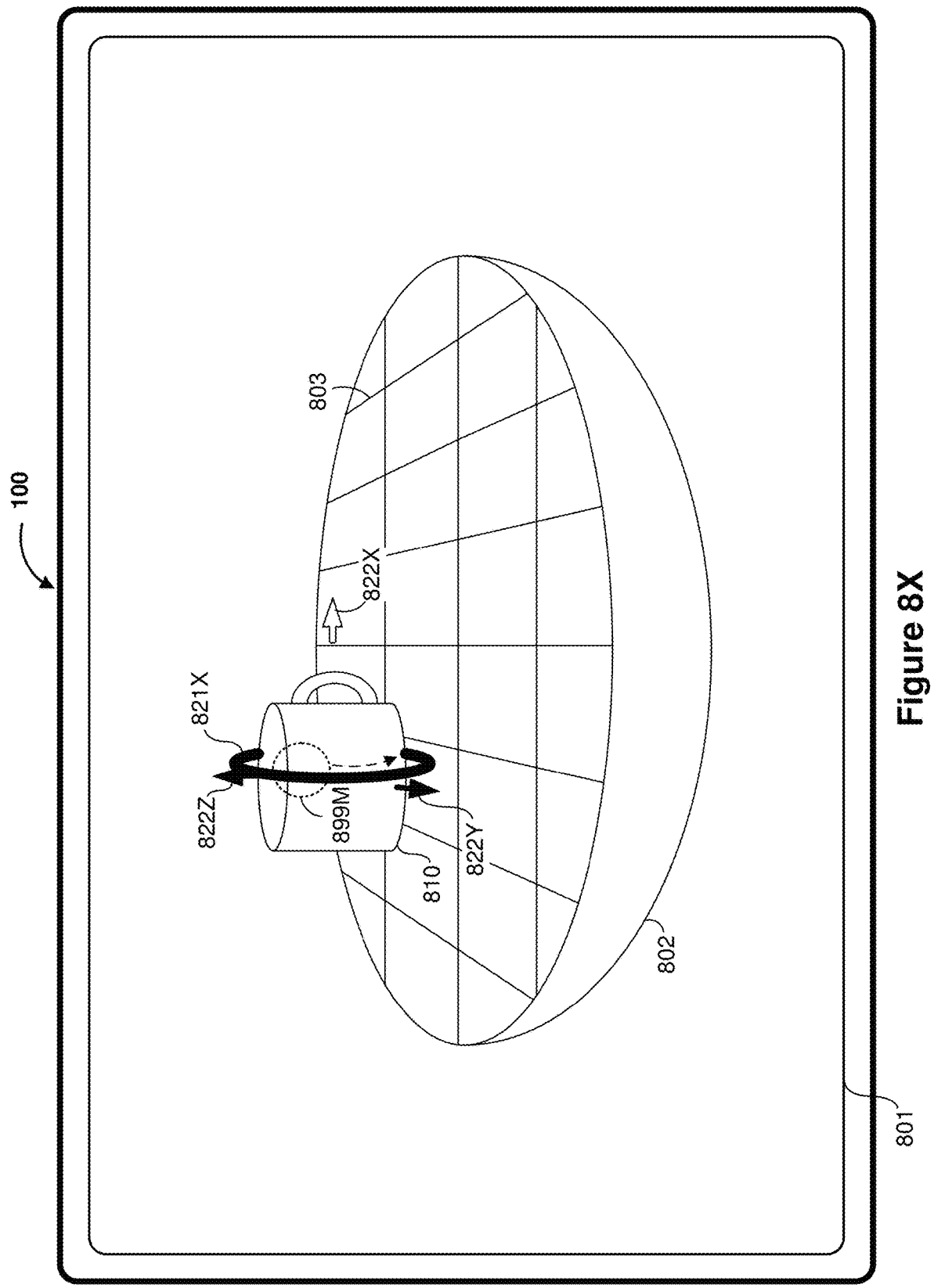
Figure 8Y:
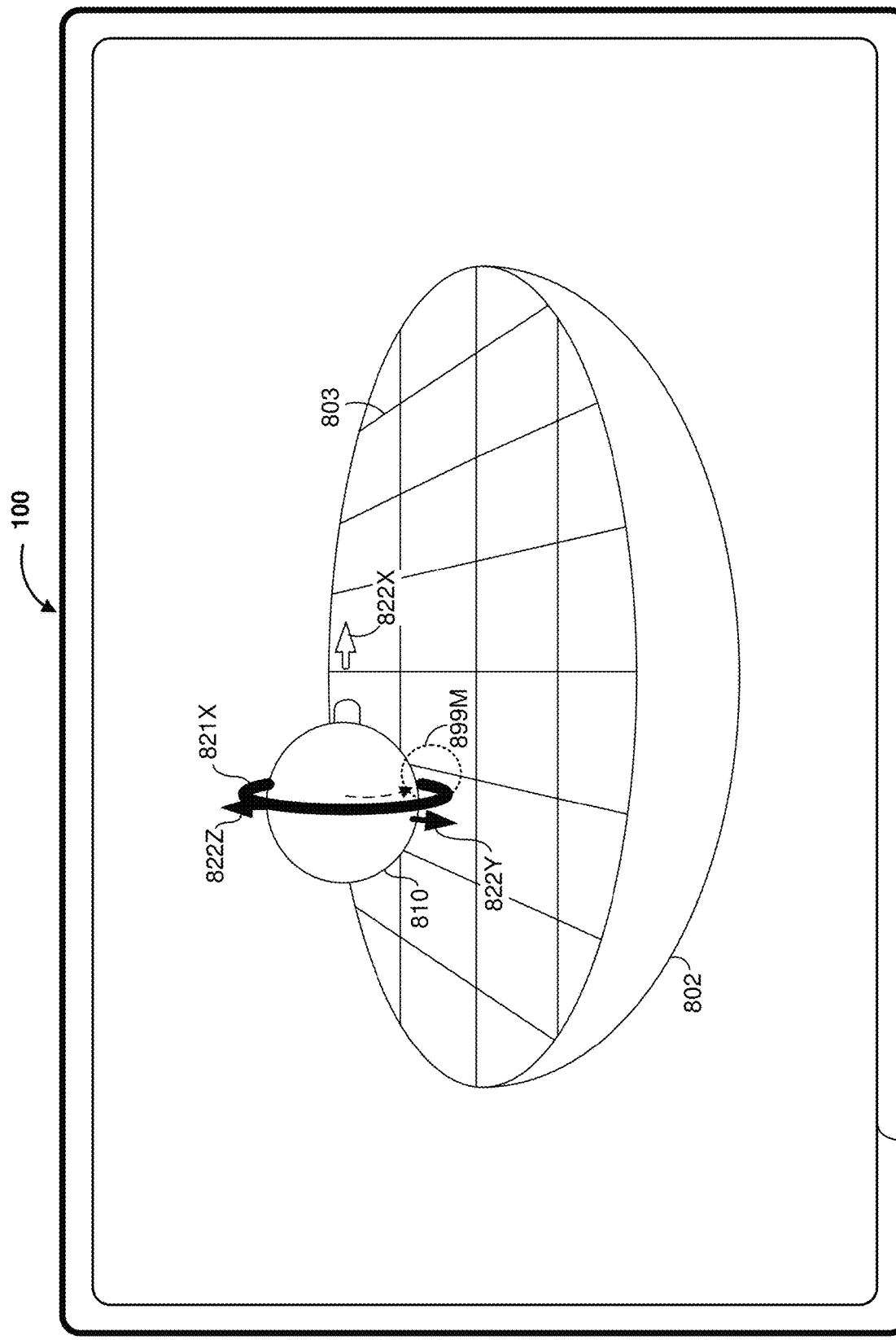

FIG. 8X illustrates the CGR scene manipulation user interface 801 in response to detecting the user input 899L directed to the x-axis arrow 822X. In FIG. 8X, the z-axis arrow 822Z is displayed in its original manner and the x-axis arrow 822X is displayed in the different manner indicating that the spatial manipulation user interface element 820 is locked to the x-axis. Accordingly, a change in virtual camera perspective does not change the set of spatial manipulation affordances of the spatial manipulation user interface element 820. However, changing the axis to which the spatial manipulation user interface element 820 is locked changes the set of spatial manipulation affordances. In particular, in FIG. 8X, the spatial manipulation user interface element 820 includes an x-axis ring 821X rather than the z-axis ring 821Z.

The x-axis ring 821X is a spatial manipulation affordance for scaling (e.g., resizing) a selected CGR object, rotation of a selected CGR object about the x-axis, and two-dimensional translation of a selected CGR object within the yz-plane. In various implementations, the x-axis ring 821X includes an edge (which is displayed as illustrated in FIG.

8X as a thick line) and an interior (within the edge). In various implementations, the edge is a spatial manipulation affordance for scaling a selected CGR object and rotation of a selected CGR object and the interior is a spatial manipulation affordance for two-dimensional translation of a selected CGR object. In various implementations, the spatial manipulation affordance for two-dimensional translation of a selected CGR object associated with the x-axis ring 821X, while the x-axis ring 821X is displayed, extends beyond the edge to encompass the selected CGR object. This may be particularly useful when the interior of the x-axis ring 821X is small as in FIG. 8X. Thus, a user may perform two-dimensional translation of the CGR mug 810 in the yz-plane by drag-and-dropping the CGR mug 810 by its handle (which is outside the interior of the x-axis ring 821X).

FIG. 8X illustrates a user input 899M directed to the edge of the x-axis ring 821X. In various implementations, the user input 899M corresponds to a moving contact (e.g., a drag or touch-and-drag) detected with a start location at the location of the edge of the x-axis ring 821X and moving along the x-axis ring 821X (e.g., beginning perpendicular to a line between the start location and the center of the x-axis ring 821X).

FIG. 8Y illustrates the CGR scene manipulation user interface 801 in response to detecting the user input 899M directed to the edge of the x-axis ring 821X. In FIG. 8Y, the CGR mug 810 (but not the spatial manipulation user interface element 820) is rotated about the x-axis.

FIG. 9 is a flowchart representation of a method 900 of spatially manipulating a three-dimensional object in a three-dimensional space in accordance with some implementations. In various implementations, the method 900 is performed by a device with one or more processors, non-transitory memory, a display, and one or more input devices (e.g., the portable multifunctional device 100 of FIG. 1A or electronic device 520 of FIG. 5). In some implementations, the method 900 is performed by processing logic, including hardware, firmware, software, or a combination thereof. In some implementations, the method 900 is performed by a processor executing instructions (e.g., code) stored in a non-transitory computer-readable medium (e.g., a memory).

The method 900 begins, at block 910, with the device displaying a three-dimensional object in a three-dimensional space from a first virtual camera perspective, wherein the three-dimensional space is defined by a three-dimensional coordinate system including three perpendicular axes. For example, in FIG. 8J, the device 100 displays the CGR mug 810 in the CGR scene from a first virtual camera perspective.

In various implementations, the three-dimensional coordinate system is a global three-dimensional coordinate system that does not change in response to spatial manipulation of the three-dimensional object. For example, in FIG. 8K1, the device 100 displays the spatial manipulation user interface element 820 including the x-axis arrow 822X, the y-axis arrow 822Y, and the z-axis arrow 822Z aligned with three perpendicular axes of the global three-dimensional coordinate system of the CGR scene. In various implementations, the three-dimensional coordinate system is a local three-dimensional coordinate system fixedly aligned with three-dimensional object as the three-dimensional object moves in a global three-dimensional coordinate system that does not change in response spatial manipulation of the three-dimensional object. For example, in FIG. 8K2, the device 100 displays the spatial user interface element 820 including the x-axis arrow 822X, the y-axis arrow 822Y, and the z-axis arrow 822Z aligned with three perpendicular axes of the local three-dimensional coordinate system of the CGR mug 810 after the CGR mug 810 had been moved (e.g., rotated) within the global three-dimensional coordinate system of the CGR scene.

The method 900 continues, in block 920, with the device displaying a spatial manipulation user interface element including a first set of spatial manipulation affordances respectively associated with a first set of spatial manipulations of the three-dimensional object, wherein the first set of spatial manipulations is based on the first virtual camera perspective. For example, in FIG. 8J, the device 100 displays the spatial manipulation user interface element 820 including the x-axis arrow 822X for one-dimensional translation along the x-axis, the y-axis arrow 822Y for one-dimensional translation along the y-axis, the z-axis arrow 822Z for one-dimensional translation along the z-axis, and (based on the y-axis being the closest axis parallel to the first virtual camera perspective or, equivalently, based on the xz-plane being the plane closest to normal to the first virtual camera perspective) the y-axis ring 821Y for, among other things, rotation about the y-axis.

The method 900 continues, in block 930, with the device detecting a user input detecting a user input changing the first virtual camera perspective to a second virtual camera perspective. For example, in FIG. 8L, the device 100 detects the user input 899F changing the virtual camera perspective.

The method 900 continues, in block 940, with the device, in response to detecting the user input changing the first virtual camera perspective to a second virtual camera perspective, displaying the three-dimensional object in the three-dimensional space from the second virtual camera perspective. For example, in FIG. 8M, in response to detecting the user input 899F, the device 100 displays the CRG mug 810 from the second virtual camera perspective.

The method 900 continues, in block 950, with the device, also in response to detecting the user input changing the first virtual camera perspective to the second virtual camera perspective, displaying the spatial manipulation user interface element including a second set of spatial manipulation affordances respectively associated with a second set of spatial manipulations of the three-dimensional object, wherein the second set of spatial manipulations is based on the second virtual camera perspective, wherein the first set of spatial manipulations includes at least one spatial manipulation excluded from the second set of spatial manipulations and the second set of spatial manipulations includes at least one spatial manipulation excluded from the first set of spatial manipulations.

For example, in FIG. 8M, in response to detecting the user input 899F, the device 100 displays the spatial manipulation user interface element 820 including the x-axis arrow 822X for one-dimensional translation along the x-axis, the y-axis arrow 822Y for one-dimensional translation along the y-axis, the z-axis arrow 822Z for one-dimensional translation along the z-axis, and (based on the z-axis being the closest axis parallel to the second virtual camera perspective or, equivalently, based on the xy-plane being the plane closest to normal to the second virtual camera perspective) the z-axis ring 821Z for, among other things, rotation about the z-axis. Whereas the spatial manipulation user interface element 820 of FIG. 8J includes an affordance for rotation about the y-axis (e.g., the y-axis ring 821Y), the spatial manipulation user interface element 820 of FIG. 8J does not include an affordance for rotation about the z-axis. Conversely, whereas the spatial manipulation user interface element 820 of FIG. 8M includes an affordance for rotation about the z-axis (e.g., the z-axis ring 821Z), the spatial manipulation user interface element 820 of FIG. 8M does not include an affordance for rotation about the y-axis.

In various implementations, the at least one spatial manipulation excluded from the second set of spatial manipulations includes two-dimensional translation in a first plane perpendicular to a first axis of the three perpendicular axes that is closest to parallel to the first virtual camera perspective and the at least one spatial manipulation excluded from the first set of spatial manipulations includes two-dimensional translation in a second plane perpendicular to a second axis of the three perpendicular axes that is closest to parallel to the second virtual camera perspective. For example, whereas the spatial manipulation user interface element 820 of FIG. 8J includes an affordance for two-dimensional translation in the xz-plane (e.g., the y-axis ring 821Y), the spatial manipulation user interface element 820 of FIG. 8J does not include an affordance for two-dimensional translation in the xy-plane. Conversely, whereas the spatial manipulation user interface element 820 of FIG. 8M includes an affordance for two-dimensional translation in the xy-plane (e.g., the z-axis ring 821Z), the spatial manipulation user interface element 820 of FIG. 8M does not include an affordance for two-dimensional translation in the xz-plane.

In various implementations, the at least one spatial manipulation excluded from the second set of spatial manipulations includes rotation about a first axis of the three perpendicular axes that is closest to parallel to the first virtual camera perspective and the at least one spatial manipulation excluded from the first set of spatial manipulations includes rotation about a second axis of the three perpendicular axes that is closest to parallel to the second virtual camera perspective. For example, whereas the spatial manipulation user interface element 820 of FIG. 8J includes an affordance for rotation about the y-axis (e.g., the y-axis ring 821Y), the spatial manipulation user interface element 820 of FIG. 8J does not include an affordance for rotation about the z-axis. Conversely, whereas the spatial manipulation user interface element 820 of FIG. 8M includes an affordance for rotation about the z-axis (e.g., the z-axis ring 821Z), the spatial manipulation user interface element 820 of FIG. 8M does not include an affordance for rotation about the y-axis.

In various implementations, the first set of spatial manipulations and the second set of spatial manipulations includes one-dimensional translations along each of the three perpendicular axes. For example, the spatial manipulation user interface element 820 of both FIG. 8J and FIG. 8M include the x-axis arrow 822X for one-dimensional translation along the x-axis, the y-axis arrow 822Y for one-dimensional translation along the y-axis, the z-axis arrow 822Z for one-dimensional translation along the z-axis.

In various implementations, the first set of spatial manipulations and the second set of spatial manipulations includes scaling. For example, the spatial manipulation user interface element 820 of FIG. 8J includes an affordance for scaling (e.g., the y-axis ring 821Y) and the spatial manipulation user interface element 820 of FIG. 8M also includes an affordance for scaling (e.g., the z-axis ring 821Z).

In various implementations, the spatial manipulation user interface element is displayed in association with the three-dimensional object. In various implementations, the spatial manipulation user interface element is displayed overlaid on the three-dimensional object. In various implementations, the spatial manipulation user interface element is displayed surrounding the three-dimensional object. For example, in FIG. 8J, the spatial manipulation user interface element 820 is displayed overlaid on and surrounding the CGR mug 810.

In various implementations, the method 900 includes, while displaying the three-dimensional object in the three-dimensional space from the second virtual camera perspective, detecting a user input locking the spatial manipulation user interface element to the second set of spatial manipulations. For example, in FIG. 8R, the device 100 detects the user input 8991 locking the spatial manipulation user interface element 820 to the z-axis.

In various implementations, the method 900 includes detecting a user input changing the second virtual camera perspective to a third virtual camera perspective. For example, in FIG. 8S, the device 100 detects the user input 899J changing the virtual camera perspective back to the first virtual camera perspective.

In various implementations, the method 900 includes, in response to detecting the user input changing the second virtual camera perspective to a third virtual camera perspective and in accordance with a determination that the spatial manipulation user interface element is locked to the second set of spatial manipulations, displaying the three-dimensional object in the three-dimensional space from the third virtual camera perspective. For example, in FIG. 8T, the device 100 displays the CGR mug 810 from the first virtual camera perspective.

In various implementations, the method 900 includes, also in response to detecting the user input changing the second virtual camera perspective to a third virtual camera perspective and in accordance with a determination that the spatial manipulation user interface element is locked to the second set of spatial manipulations, displaying the spatial manipulation user interface element including the second set of spatial manipulation affordances. For example, in FIG. 8T, even though the y-axis is closest to perpendicular to the current virtual camera perspective (e.g., the first virtual camera perspective), the device 100 displays the spatial manipulation user interface element 820 including the z-axis ring 821Z, not the y-axis ring 821Y.

In various implementations, the method 900 includes while displaying the three-dimensional object in the three-dimensional space from the second virtual camera perspective, detecting a user input locking the spatial manipulation user interface element to a third set of spatial manipulations of the three-dimensional object. For example, in FIG. 8W, the device 100 detects the user input 899L locking the spatial manipulation user interface element 820 to the x-axis.

In various implementations, the method 900 includes, in response to detecting the user input locking the spatial manipulation user interface element to the third set of spatial manipulations of the three-dimensional object, displaying the three-dimensional object in the three-dimensional space from the second virtual camera perspective. For example, in FIG. 8X, in response to detecting the user input 899L, the device 100 displays the CGR mug 810 from the same virtual camera perspective as in FIG. 8W.

In various implementations, the method 900 includes, also in response to detecting the user input locking the spatial manipulation user interface element to the third set of spatial manipulations of the three-dimensional object, displaying the spatial manipulation user interface element including a third set of spatial manipulation affordances respectively associated with the third set of spatial manipulations of the three-dimensional object, wherein the third set of spatial manipulations includes at least one spatial manipulation excluded from the second set of spatial manipulations and the second set of spatial manipulations includes at least one spatial manipulation excluded from the third set of spatial manipulations.

For example, in FIG. 8X, the device 100 displays the spatial manipulation user interface element 820 including the x-axis arrow 822X for one-dimensional translation along the x-axis, the y-axis arrow 822Y for one-dimensional translation along the y-axis, the z-axis arrow 822Z for one-dimensional translation along the z-axis, and (based on the spatial manipulation user interface element 820 being locked to the x-axis) the x-axis ring 821X for, among other things, rotation about the x-axis. Whereas the spatial manipulation user interface element 820 of FIG. 8M includes an affordance for rotation about the z-axis (e.g., the z-axis ring 821Z), the spatial manipulation user interface element 820 of FIG. 8M does not include an affordance for rotation about the x-axis. Conversely, whereas the spatial manipulation user interface element 820 of FIG. 8X includes an affordance for rotation about the x-axis (e.g., the x-axis ring 821X), the spatial manipulation user interface element 820 of FIG. 8X does not include an affordance for rotation about the z-axis.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIG. 9, optionally, implemented by components depicted in FIGS. 1A-1B. For example, the user inputs and user interface elements are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some implementations, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best use the invention and various described implementations with various modifications as are suited to the particular use contemplated.

What is claimed is:

1. A non-transitory memory storing one or more programs, which, when executed by one or more processors of a device with a display, cause the device to:
   display, in a file composing application executed by the device, a three-dimensional object in a three-dimensional space from a first virtual camera perspective, wherein the three-dimensional space is defined by a three-dimensional coordinate system including three perpendicular axes;
   display, in the file composing application, a spatial manipulation user interface element including a first set of spatial manipulation affordances respectively associated with a first set of spatial manipulations of the three-dimensional object, wherein the first set of spatial manipulations is based on the first virtual camera perspective;
   detect a user input changing the first virtual camera perspective to a second virtual camera perspective;
   in response to detecting the user input changing the first virtual camera perspective to the second virtual camera perspective:
      display, in the file composing application, the three-dimensional object in the three-dimensional space from the second virtual camera perspective; and
      display, in the file composing application, the spatial manipulation user interface element including a second set of spatial manipulation affordances respectively associated with a second set of spatial manipulations of the three-dimensional object, wherein the second set of spatial manipulations is based on the second virtual camera perspective, wherein the first set of spatial manipulations includes at least one spatial manipulation excluded from the second set of spatial manipulations and the second set of spatial manipulations includes at least one spatial manipulation excluded from the first set of spatial manipulations.

2. The non-transitory memory of claim 1, wherein each of the set of spatial manipulations corresponds to a translational movement along a distinct axis of the three-dimensional space.

3. The non-transitory memory of claim 1, wherein the set of spatial manipulation affordances includes:
   an x-axis arrow that enables a translational movement of the three-dimensional object along an x-axis of the three-dimensional space,
   an y-axis arrow that enables a translational movement of the three-dimensional object along an y-axis of the three-dimensional space, and
   an z-axis arrow that enables a translational movement of the three-dimensional object along an z-axis of the three-dimensional space.

4. The non-transitory memory of claim 1, wherein the one or more programs further cause the device to:
   in response to detecting the first user input, translationally move the spatial manipulation user interface element along the first axis of the three-dimensional space.

5. The non-transitory memory of claim 1, wherein the first user input includes a moving New that begins at the first spatial manipulation affordance.

6. The non-transitory memory of claim 1, wherein the one or more programs further cause the device to:
   detect, via one or more input devices, a second user input directed to a second spatial manipulation affordance of the spatial manipulation affordances, wherein the second spatial manipulation affordance is associated with a second axis of the three-dimensional space that is different from the first axis; and
   in response to detecting the second user input directed to the second spatial manipulation affordance, translationally move the three-dimensional object along the second axis of the three-dimensional space.

7. A method comprising:

at a device including one or more processors, non-transitory memory, one or more input devices, and a display:

displaying a three-dimensional object in a three-dimensional space, wherein the three-dimensional space is defined by a three-dimensional coordinate system;

displaying a spatial manipulation user interface element including a set of spatial manipulation affordances respectively associated with a set of spatial manipulations of the three-dimensional object, wherein each of the set of spatial manipulations corresponds to a translational movement of the three-dimensional object along a corresponding axis of the three-dimensional space;

detecting, via one or more input devices, a first user input directed to a first spatial manipulation affordance of the spatial manipulation affordances, wherein the first spatial manipulation affordance is associated with a first axis of the three-dimensional space; and in response to detecting the first user input directed to the first spatial manipulation affordance, translationally moving the three-dimensional object along the first axis of the three-dimensional space.

8. The method of claim 7, wherein each of the set of spatial manipulations corresponds to a translational movement along a distinct axis of the three-dimensional space.

9. The method of claim 8, wherein the set of spatial manipulation affordances includes:

an x-axis arrow that enables a translational movement of the three-dimensional object along an x-axis of the three-dimensional space, an y-axis arrow that enables a translational movement of the three-dimensional object along an y-axis of the three-dimensional space, and an z-axis arrow that enables a translational movement of the three-dimensional object along an z-axis of the three-dimensional space.

10. The method of claim 7, in further response to detecting the first user input, translationally moving the spatial manipulation user interface element along the first axis of the three-dimensional space.

11. The method of claim 7, wherein the first user input includes a selection of the first spatial manipulation affordance.

12. The method of claim 7, wherein the first user input includes a moving contact that begins at the first spatial manipulation affordance.

13. The method of claim 12, wherein the moving contact corresponds to a drag or a touch-and-drag.

14. The method of claim 7, further comprising:

detecting, via one or more input devices, a second user input directed to a second spatial manipulation affordance of the spatial manipulation affordances, wherein the second spatial manipulation affordance is associated with a second axis of the three-dimensional space different from the first axis; and in response to detecting the second user input directed to the second spatial manipulation affordance, translationally moving the three-dimensional object along the second axis of the three-dimensional space.

15. The method of claim 7, wherein displaying the three-dimensional object is from a particular virtual camera perspective, and wherein display of the set of spatial manipulation affordances is based on the particular virtual camera perspective.

16. The method of claim 7, wherein the spatial manipulation user interface element is displayed adjacent to the three-dimensional object.

17. The method of claim 7, wherein the spatial manipulation user interface element is displayed overlaid on the three-dimensional object.

18. The method of claim 7, wherein the three-dimensional coordinate system is a global three-dimensional coordinate system that does not change in response to a spatial manipulation of the three-dimensional object.

19. The method of claim 7, wherein the three-dimensional coordinate system is a local three-dimensional coordinate system fixedly aligned with the three-dimensional object as the three-dimensional object moves in a global three-dimensional coordinate system that does not change in response to a spatial manipulation of the three-dimensional object.

20. A device comprising:

one or more input devices;

a display;

a non-transitory memory; and one or more processors to:

display a three-dimensional object in a three-dimensional space, wherein the three-dimensional space is defined by a three-dimensional coordinate system;

display a spatial manipulation user interface element including a set of spatial manipulation affordances respectively associated with a set of spatial manipulations of the three-dimensional object, wherein each of the set of spatial manipulations corresponds to a translational movement of the three-dimensional object along a corresponding axis of the three-dimensional space;

detect, via one or more input devices, a first user input directed to a first spatial manipulation affordance of the spatial manipulation affordances, wherein the first spatial manipulation affordance is associated with a first axis of the three-dimensional space; and in response to detecting the first user input directed to the first spatial manipulation affordance, translationally move the three-dimensional object along the first axis of the three-dimensional space.

21. The device of claim 20, wherein each of the set of spatial manipulations corresponds to a translational movement along a distinct axis of the three-dimensional space.

22. The device of claim 21, wherein the set of spatial manipulation affordances includes:

an x-axis arrow that enables a translational movement of the three-dimensional object along an x-axis of the three-dimensional space, an y-axis arrow that enables a translational movement of the three-dimensional object along an y-axis of the three-dimensional space, and an z-axis arrow that enables a translational movement of the three-dimensional object along an z-axis of the three-dimensional space.

23. The device of claim 20, in further response to detecting the first user input, the one or more processors translationally move the spatial manipulation user interface element along the first axis of the three-dimensional space.

24. The device of claim 20, wherein the first user input includes a moving contact that begins at the first spatial manipulation affordance.

25. The device of claim 20, wherein the one or more processors:

detect, via one or more input devices, a second user input directed to a second spatial manipulation affordance of the spatial manipulation affordances, wherein the second spatial manipulation affordance is associated with a second axis of the three-dimensional space that is different from the first axis; and in response to detecting the second user input directed to the second spatial manipulation affordance, translationally move the three-dimensional object along the second axis of the three-dimensional space.

* * * * *

UNITED STATES PATENT AND TRADEMARK OFFICE
CERTIFICATE OF CORRECTION

| | |
|---|---|
| PATENT NO. | : 11,429,246 B2 |
| APPLICATION NO. | : 17/492304 |
| DATED | : August 30, 2022 |
| INVENTOR(S) | : Gerald Louis Guyomard et al. |

It is certified that error appears in the above-identified patent and that said Letters Patent is hereby corrected as shown below:

In the Specification

Column 38, Line 23 reading:
"detecting a user input detecting a user input changing the"
Should read:
"detecting a user input changing the".

Signed and Sealed this
Tenth Day of September, 2024

Katherine Kelly Vidal
*Director of the United States Patent and Trademark Office*